United States Patent
Kim et al.

(10) Patent No.: US 9,436,890 B2
(45) Date of Patent: Sep. 6, 2016

(54) METHOD OF GENERATING FEATURE VECTOR, GENERATING HISTOGRAM, AND LEARNING CLASSIFIER FOR RECOGNITION OF BEHAVIOR

(71) Applicant: Samsung Electronics Co., Ltd., Suwon-Si, Gyeonggi-Do (KR)

(72) Inventors: Won Jun Kim, Hwaseong-si (KR); Byung In Yoo, Seoul (KR); Jae Joon Han, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 14/562,948

(22) Filed: Dec. 8, 2014

(65) Prior Publication Data

US 2015/0206026 A1    Jul. 23, 2015

(30) Foreign Application Priority Data

Jan. 23, 2014 (KR) .................. 10-2014-0008534
Feb. 6, 2014 (KR) .................. 10-2014-0013706

(51) Int. Cl.
    *G06K 9/00*    (2006.01)
    *G06K 9/46*    (2006.01)

(52) U.S. Cl.
    CPC ......... *G06K 9/4642* (2013.01); *G06K 9/00335* (2013.01); *G06K 9/4604* (2013.01)

(58) Field of Classification Search
    None
    See application file for complete search history.

(56) References Cited

U.S. PATENT DOCUMENTS

| | | | |
|---|---|---|---|
| 6,223,183 B1* | 4/2001 | Smith | G06F 17/30017 |
| 7,203,381 B2* | 4/2007 | Motomura | G06T 3/40 |
| | | | 382/280 |
| 7,756,341 B2* | 7/2010 | Perronnin | G06K 9/4676 |
| | | | 382/176 |
| 7,994,508 B2 | 8/2011 | Ye | |
| 8,103,090 B2 | 1/2012 | Ma et al. | |
| 8,238,614 B2* | 8/2012 | Konishi | G03G 15/5025 |
| | | | 382/112 |
| 8,396,246 B2 | 3/2013 | Anbalagan et al. | |
| 8,396,247 B2 | 3/2013 | Zhang et al. | |
| 8,411,932 B2* | 4/2013 | Liu | H04N 13/0022 |
| | | | 345/422 |
| 2005/0152619 A1* | 7/2005 | Motomura | G06T 3/40 |
| | | | 382/299 |
| 2007/0005356 A1* | 1/2007 | Perronnin | G06K 9/4676 |
| | | | 704/245 |
| 2009/0080782 A1* | 3/2009 | Konishi | G03G 15/5025 |
| | | | 382/218 |
| 2010/0014781 A1* | 1/2010 | Liu | H04N 13/0022 |
| | | | 382/285 |
| 2012/0134576 A1* | 5/2012 | Sharma | G06K 9/4604 |
| | | | 382/155 |

OTHER PUBLICATIONS

Wikipedia, Structure tensor, published on Jan. 20, 2013.*

(Continued)

*Primary Examiner* — Feng Niu
(74) *Attorney, Agent, or Firm* — Harness, Dickey & Pierce, P.L.C.

(57) ABSTRACT

Example embodiments disclose a method of generating a feature vector, a method of generating a histogram, a learning unit classifier, a recognition apparatus, and a detection apparatus, in which a feature point is detected from an input image based on a dominant direction analysis of a gradient distribution, and a feature vector corresponding to the detected feature point is generated.

42 Claims, 25 Drawing Sheets

(56) References Cited

OTHER PUBLICATIONS

Wu et al., "Efficient and Effective Visual Codebook Generation Using Additive Kernels", Journal of Machine Learning Research 12 (2011), pp. 3097-3118.*

M. Blank, "Actions as Space-Time Shapes", Computer Society, Tenth IEEE International Conference on Computer Vision, 2005, 8pgs, Israel.

G. Kühne, "Motion-based Segmentation and Classification of Video Objects", Dissertation, 2002, 164pgs, Mannheim, Germany.

J. Niebles, "Unsupervised Learning of Human Action Categories Using Spatial-Temporal Words", Springer Science+Business Media, 2008, 20pgs, vol. 79.

Y. Boureau, "Learning Mid-Level Features for Recognition", Computer Vision and Pattern Recognition (CVPR), 2010, 8pgs.

A. Fathi, "Action Recognition by Learning Mid-level Motion Features", IEEE, 2008, 8pgs, Canada.

W. Li, "Action Recognition Based on a Bag of 3D Points", IEEE Computer Society, 2012, 6pgs, Issue No. 02, vol. 19.

I. Laptev, "On Space-Time Interest Points", International Journal of Computer Vision, 2005, 17pgs, 64(2/3), The Netherlands.

S. Lazebnik, "Beyond Bags of Features: Spatial Pyramid Matching for Recognizing Natural Scene Categories", Computer Vision and Pattern Recognition, IEEE Computer Society Conference, 2006, 8pgs, vol. 2.

L. Liu, "In Defense of Soft-assignment Coding", Computer Vision, 2011, 8pgs, IEEE.

* cited by examiner

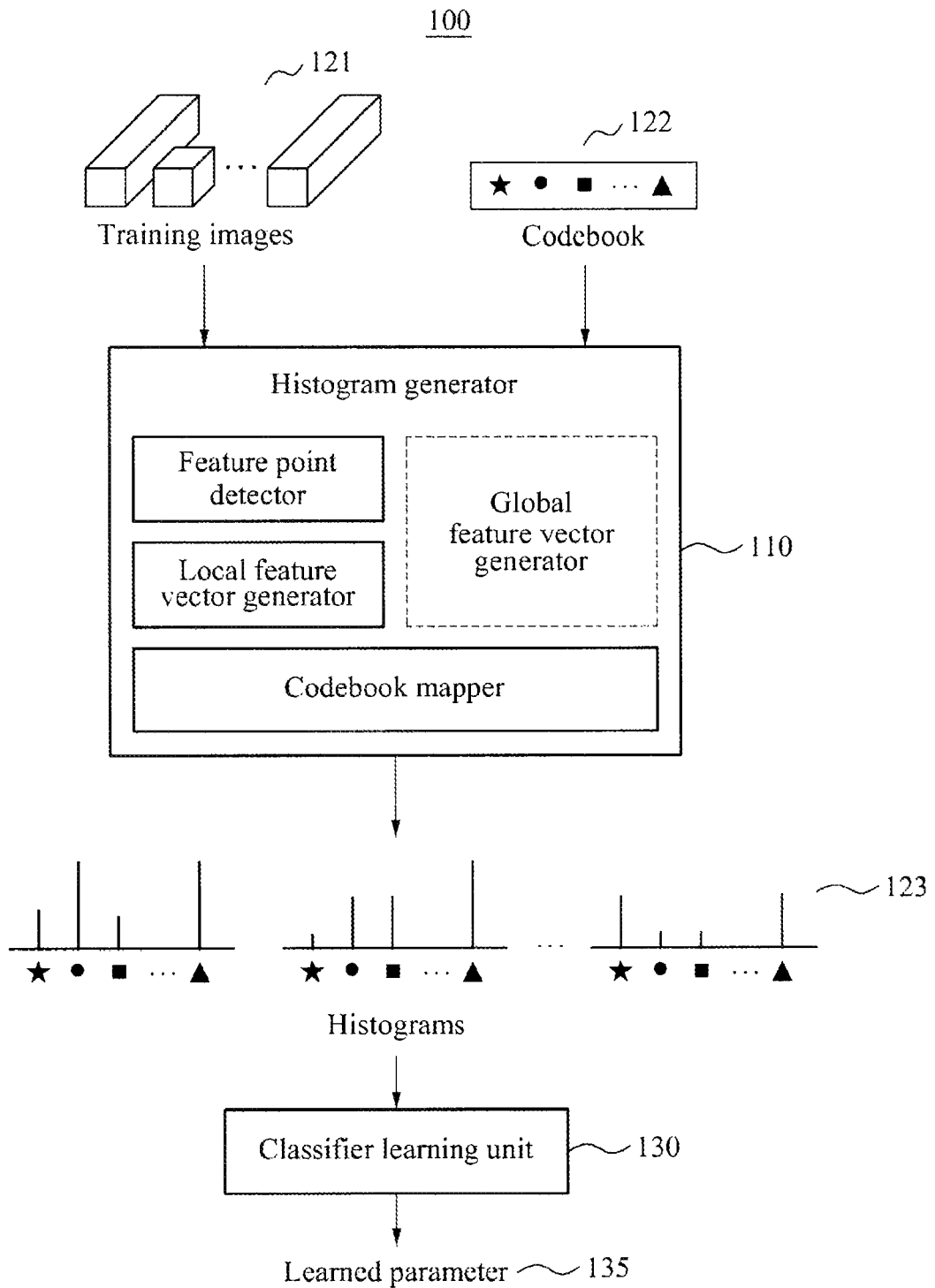

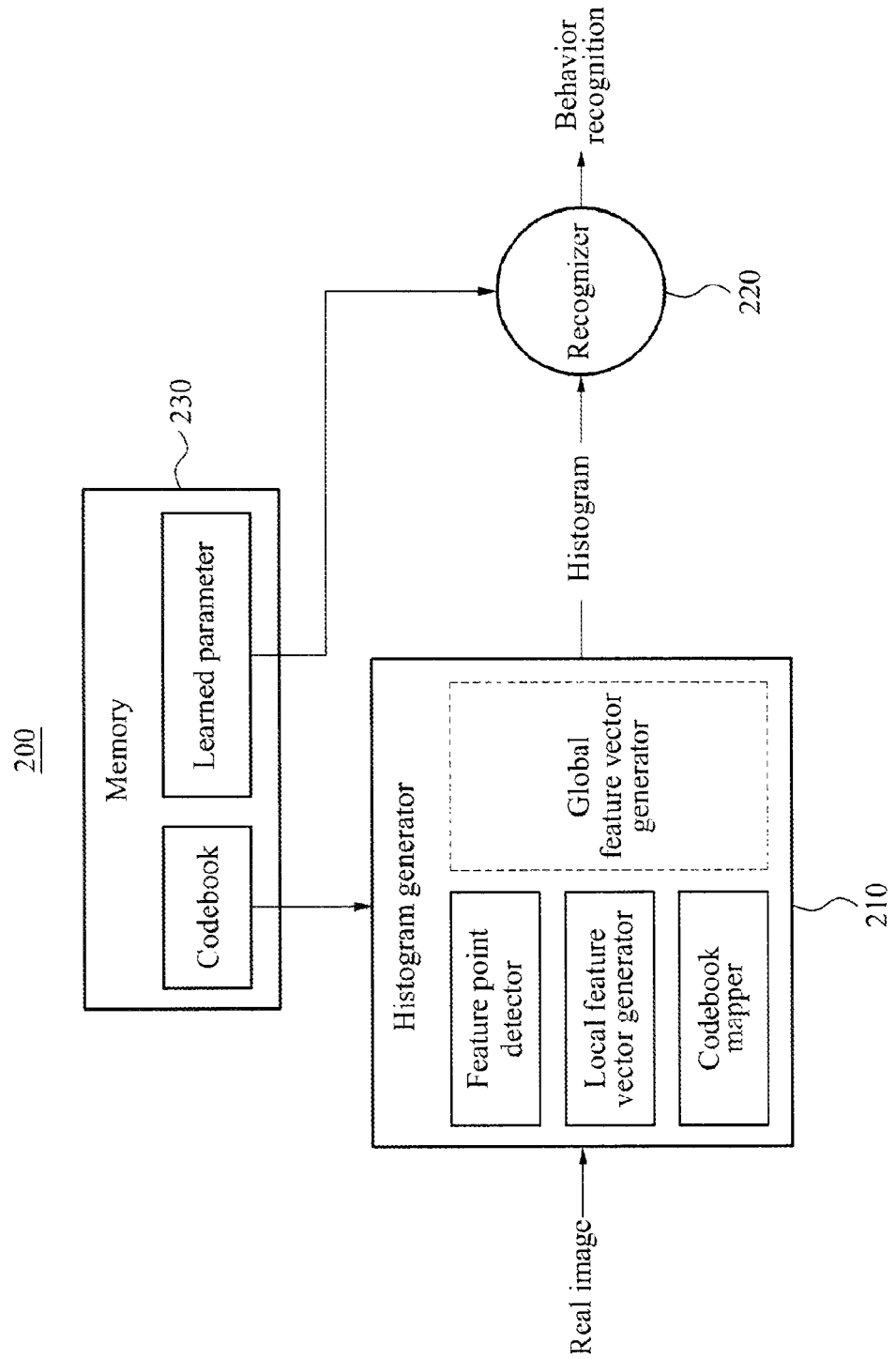

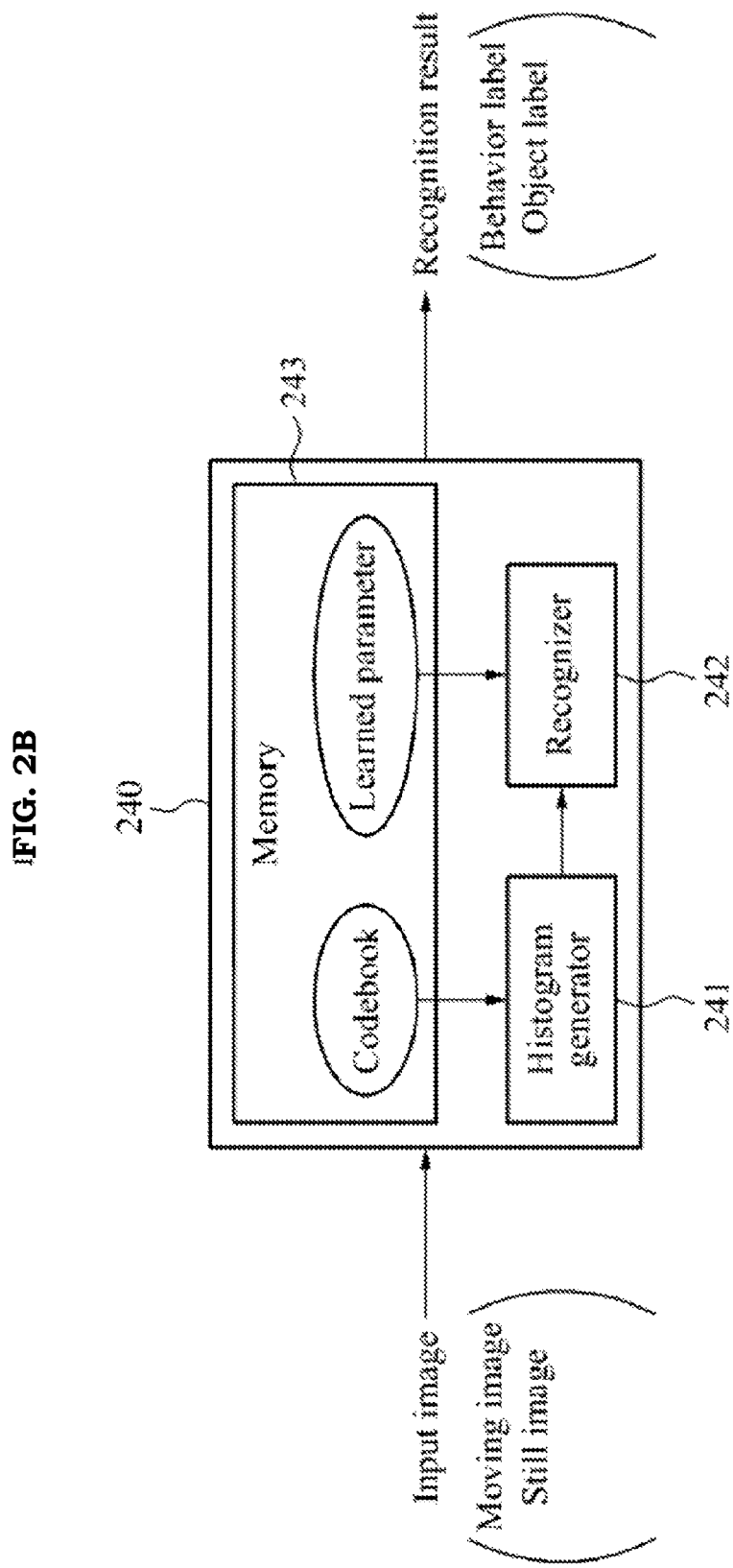

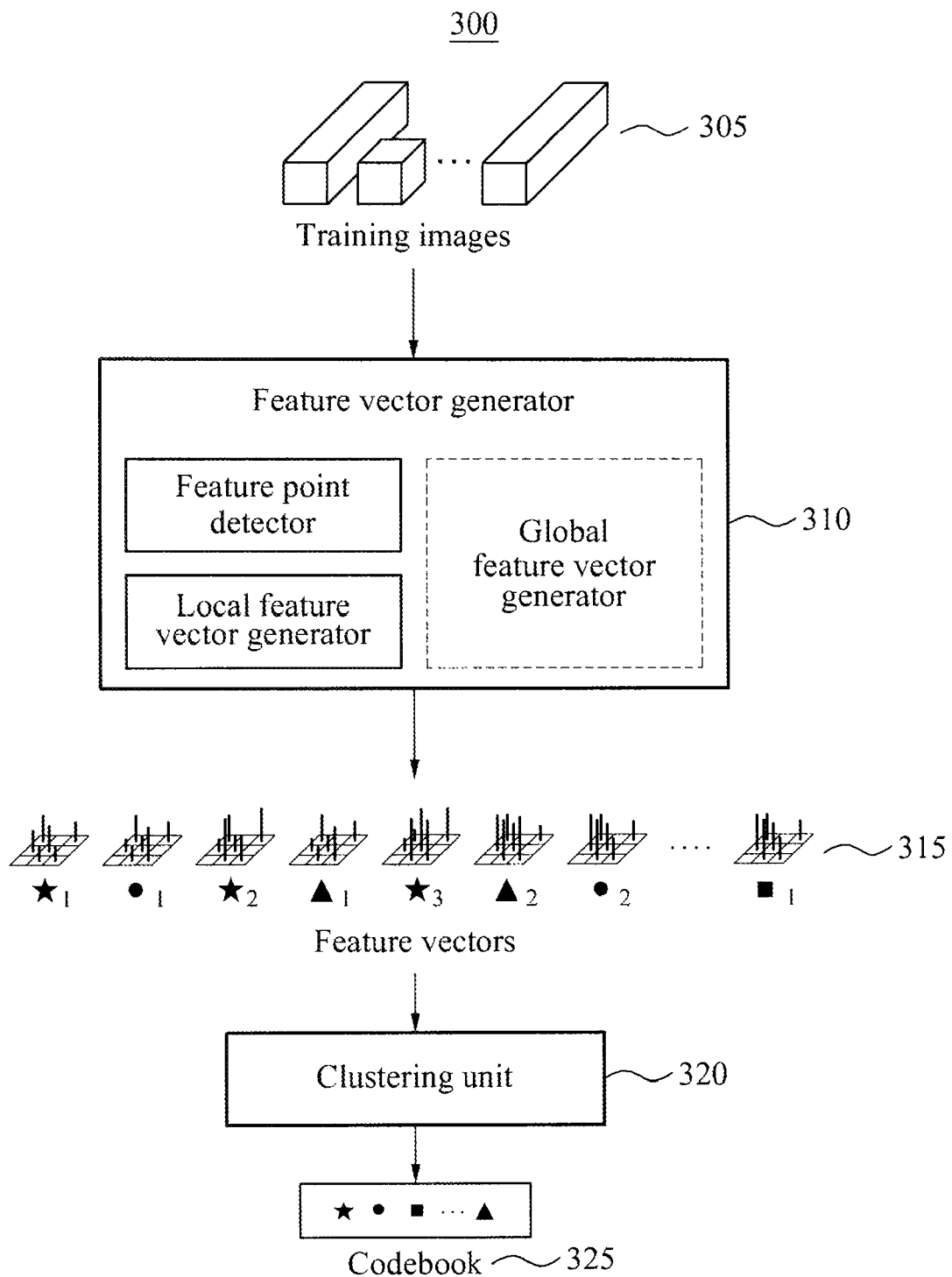

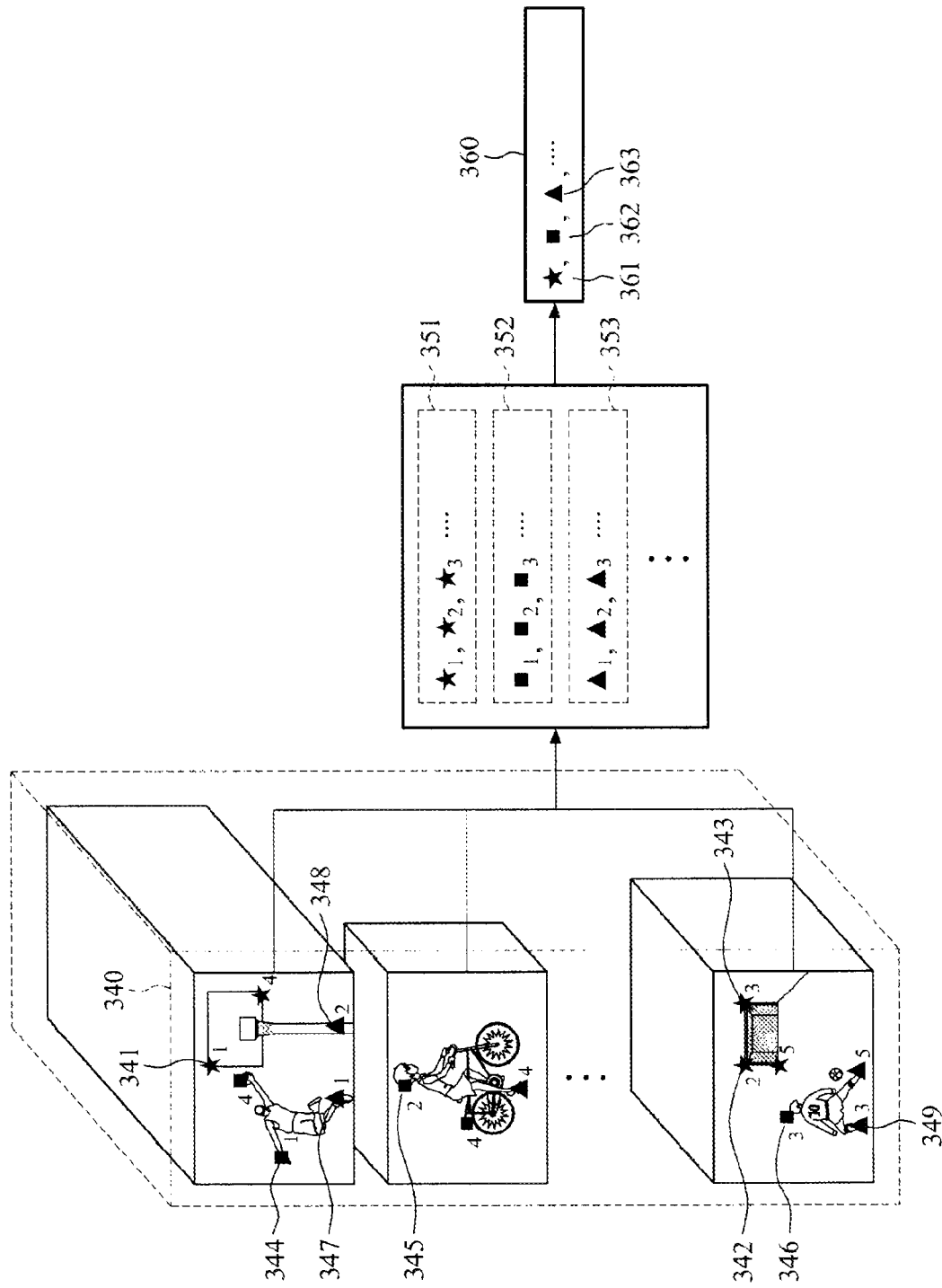

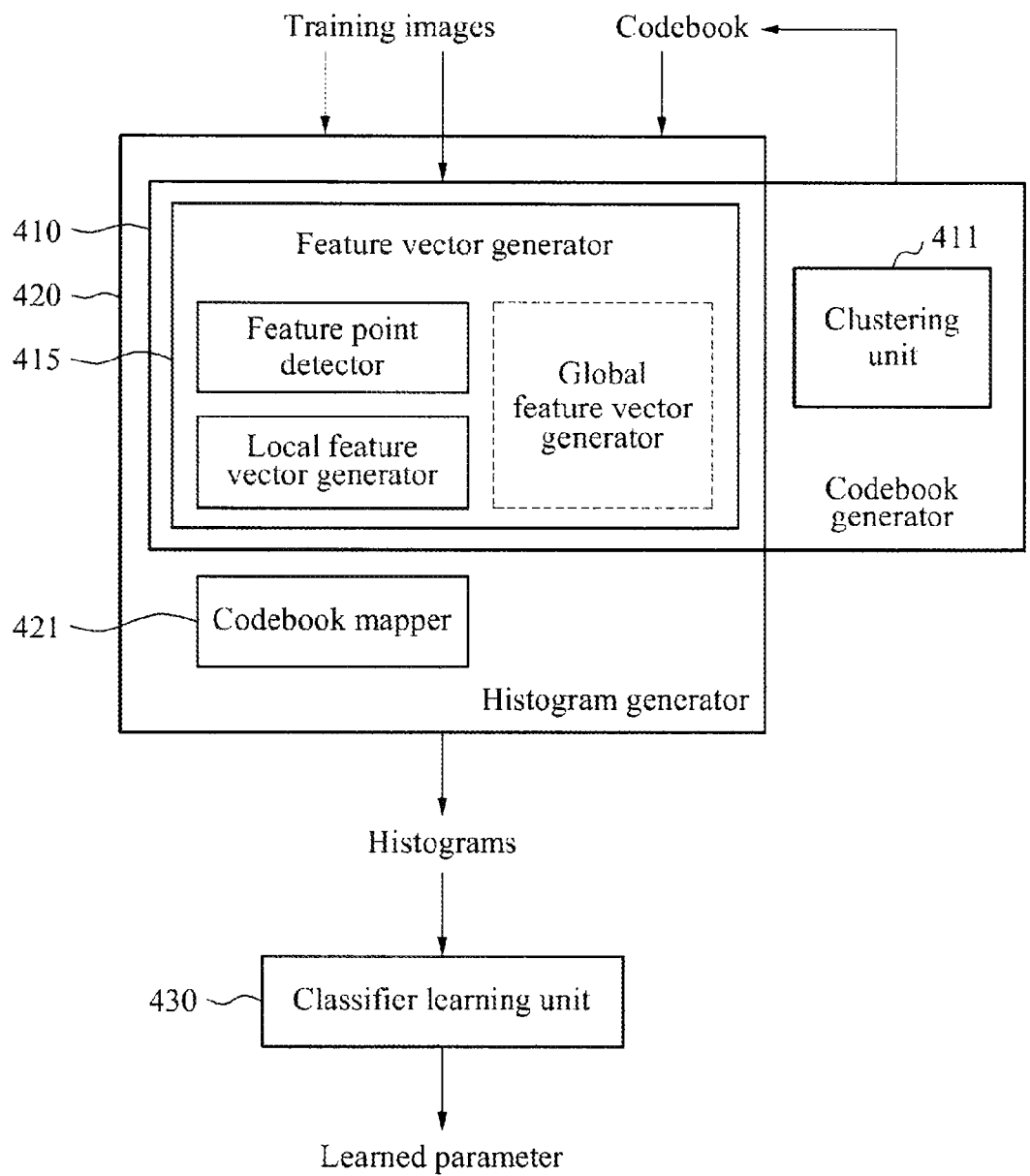

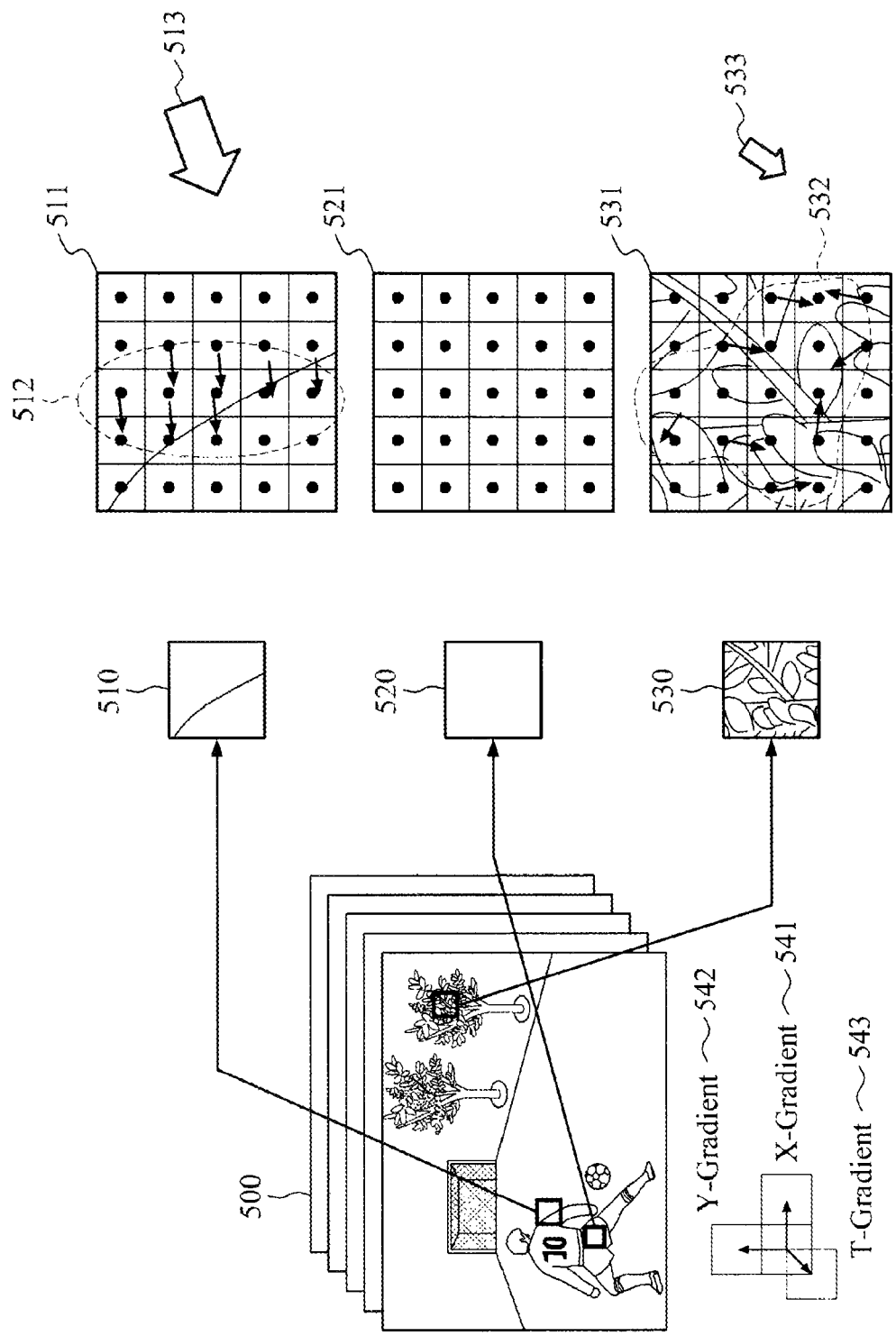

FIG. 6C $$A_i = (\lambda'_i, e'_i)$$

FIG. 12
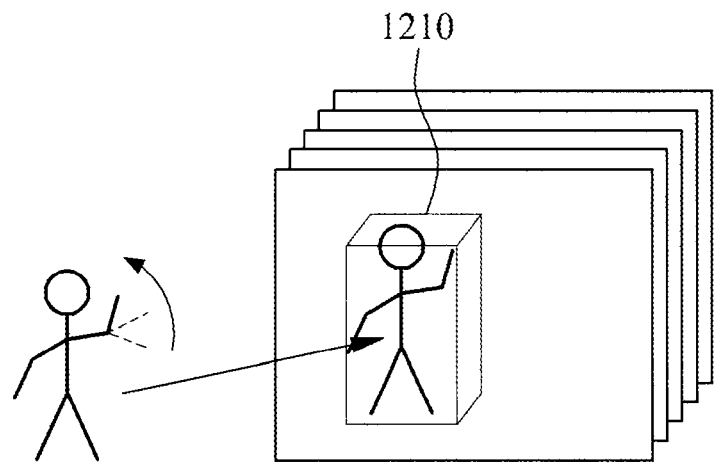
(a)
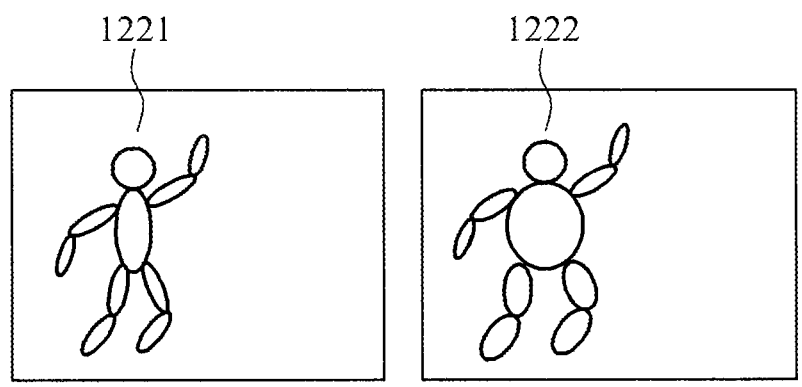
(b)
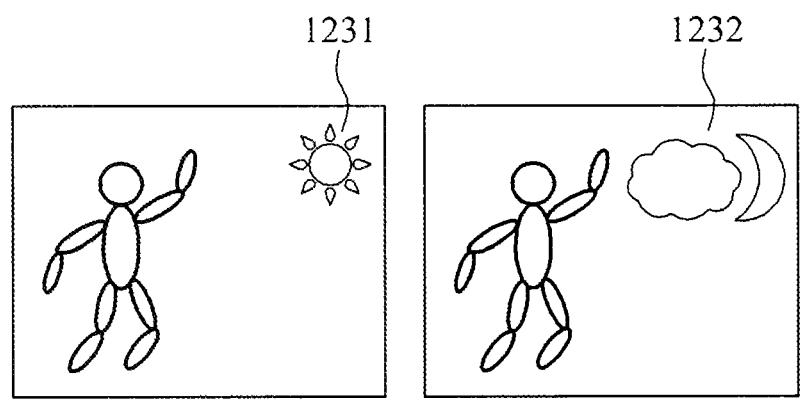
(c)

FIG. 13
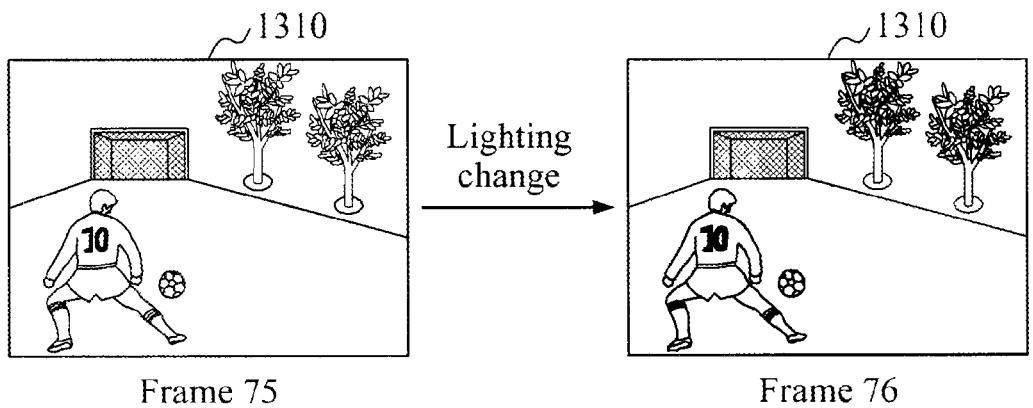
Frame 75 — Lighting change → Frame 76
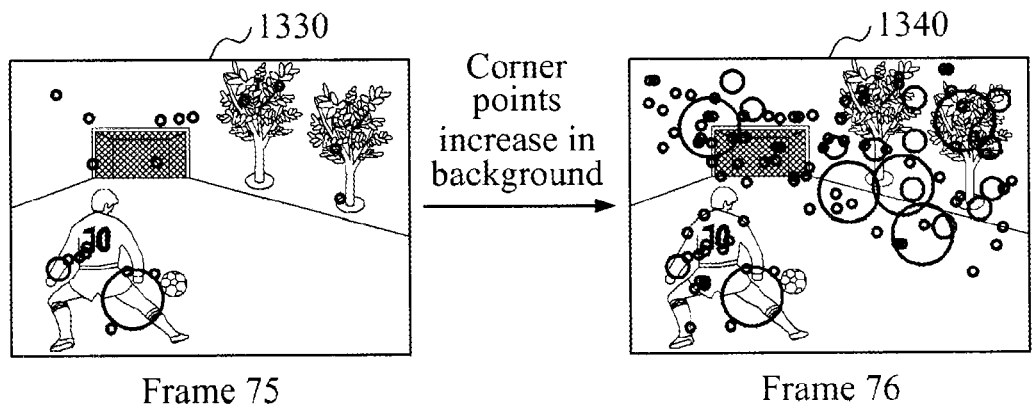
Frame 75 — Corner points increase in background → Frame 76
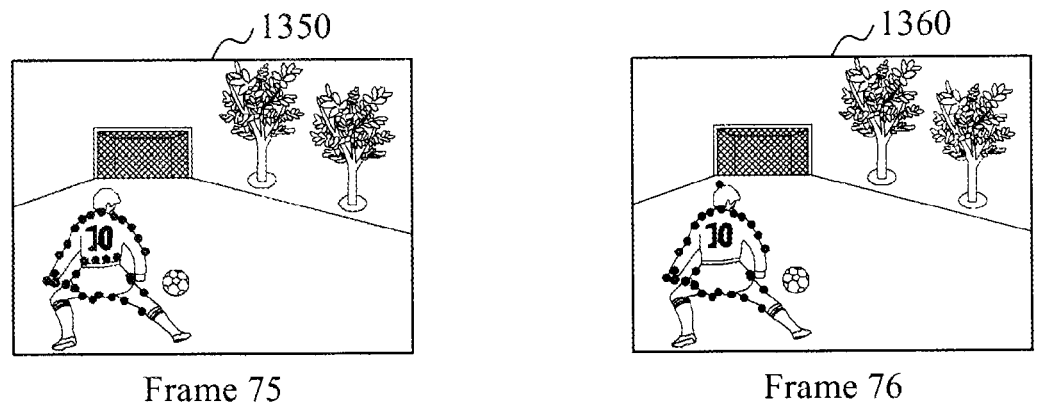
Frame 75  Frame 76

FIG. 14
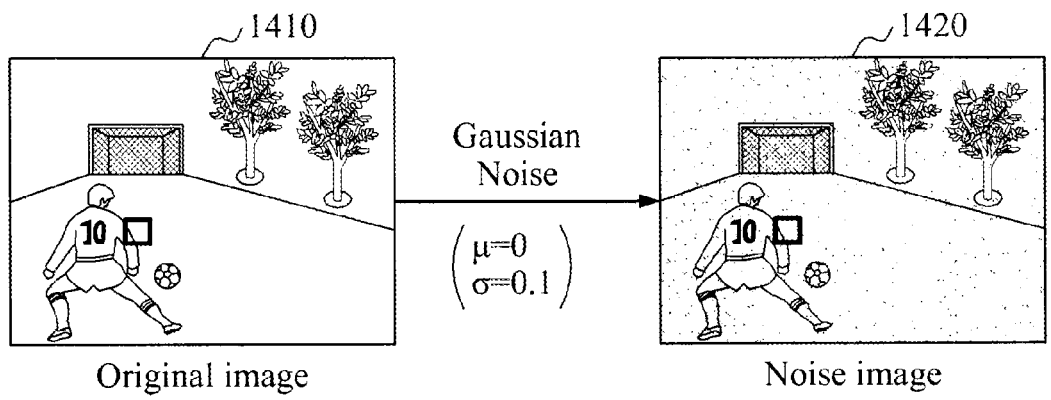
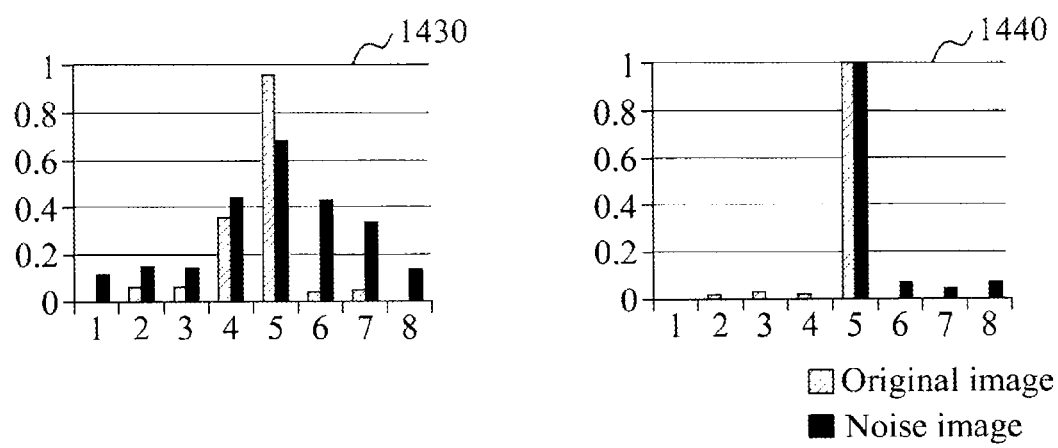

METHOD OF GENERATING FEATURE VECTOR, GENERATING HISTOGRAM, AND LEARNING CLASSIFIER FOR RECOGNITION OF BEHAVIOR

CROSS-REFERENCE TO RELATED APPLICATIONS

This application claims the priority benefit of Korean Patent Application No. 10-2014-0008534, filed on Jan. 23, 2014, and No. 10-2014-0013706, filed on Feb. 6, 2014, in the Korean Intellectual Property Office, the entire disclosures of each of which are incorporated herein by reference.

BACKGROUND

1. Field

Example embodiments of the following description relate to a behavior recognition method.

2. Description of the Related Art

Technology for recognizing a behavior from an input image is applied to a computer vision application system. In general, the technology for recognizing the behavior from the input image employs a method of recognizing a behavior by setting a patch, representing a feature extracted from the patch as a vector, and applying the feature vector to a learning classifier. A classifier of a concise framework obtains a distance between vectors such as a Euclidean distance or a similarity such as a normalized correlation, and recognizes a behavior by comparing the distance between the vectors or the similarity to a threshold value. Examples of a relatively more elaborate classifier include a neural network, a Bayesian classifier, a support vector machine (SVM) learning classifier, and an Adaboost learning classifier.

SUMMARY

At least one example embodiment discloses a method of generating a feature vector, the method including determining a gradient distribution in at least one region of an input image; determining a dominant direction in the at least one region based on the gradient distribution; detecting a feature point from the input image based on the dominant direction, and generating a feature vector corresponding to the feature point.

The detecting of the feature point may include detecting a pixel corresponding to a window, the detected pixel having a contrast of coherence, the contrast of coherence being an indication of differences between at least one eigenvalue associated with the detected pixel and eigenvalues of other pixels in the window. The generating of the feature vector may include accumulating a strength of coherence corresponding to the feature point to generate the feature vector, the strength of coherence being based on a difference between eigenvalues associated with the feature point.

The detecting of the feature point may include calculating a gradient for at least one pixel in the input image, calculating a structure tensor for the at least one pixel based on the gradient, calculating a maximum eigenvalue for the at least one pixel based on the structure tensor, and determining the feature point based on the maximum eigenvalue.

The generating of the feature vector may include mapping the dominant direction of a local pixel in the at least one region to one of the plurality of bins, and determining a dominant direction energy of the local pixel in the mapped bin. The method may further include generating a feature vector corresponding to the input image based on a frequency analysis of the input image.

At least one example embodiment discloses a method of image processing, the method including determining a gradient distribution in at least one region of an input image; determining a dominant direction in the at least one region based on the gradient distribution; detecting a plurality of feature points in the input image based on a dominant direction analysis of a gradient distribution, generating a plurality of feature vectors corresponding to the plurality of feature points, mapping the plurality of feature vectors to codewords in a codebook, and generating a histogram corresponding to the input image based on the mapped feature vectors.

The method may further include analyzing the input image based on a learned parameter and the histogram and generating the learned parameter by learning a plurality of training images based on a dominant direction of a gradient distribution in the plurality of training images. The analyzing of the input image may include recognizing content of the input image.

The method may further include detecting a set of feature points from a plurality of training images, the set of feature points being different than the plurality of feature points, generating a set of feature vectors corresponding to a portion of the set of feature points, the set of feature vectors being different than the plurality of feature vectors, and clustering the set of feature vectors, and generating the codebook.

At least one example embodiment discloses an apparatus for learning a classifier, the apparatus including a detector configured to detect a plurality of feature points in a plurality of training images based on a dominant direction of a gradient distribution in the plurality of training images, a generator configured to generate a plurality of feature vectors corresponding to the plurality of feature points, a mapper configured to map the plurality of feature vectors to codewords vectors in a codebook, and generate a histogram based on the mapped feature, and a learning unit configured to learn a classifier based on the histogram.

The learning unit may is configured to receive the histogram and a label of the plurality of training images to learn the classifier. The apparatus may further include a clustering unit configured to cluster the plurality of feature vectors, and generate the codebook.

At least one example embodiment discloses a recognition apparatus, the apparatus including a detector configured to detect a plurality of feature points in an input image based on a dominant direction of a gradient distribution in the input image, a generator configured to generate a plurality of feature vectors corresponding to the plurality of feature points, a mapper configured to map the plurality of feature vectors to codewords in a codebook, and generate a histogram based on the mapped feature vectors, and a recognizer configured to recognize content of the input image based on a learned parameter and the histogram.

The content of the input image may include at least one of a behavior of a subject in the input image, and an object included in the input image.

At least one example embodiment discloses a detection apparatus, the apparatus including a feature point detector to detect a plurality of feature points included in at least a portion of an input image based on a dominant direction of a gradient distribution in the portion of the input image, a generator configured to generate a plurality of feature vectors corresponding to the plurality of feature points, a mapper configured to map the plurality of feature vectors to codewords in a codebook, and generate a histogram based on the mapped feature vectors, and a region detector configured to compare a reference histogram to the histogram, and detect a region corresponding to the reference histogram.

The feature point detector is configured to detect a plurality of reference feature points in a reference image based on the dominant direction of a gradient distribution of the reference image, the generator is configured to generate a plurality of reference feature vectors corresponding to the plurality of reference feature points, and the mapper is configured to map the plurality of reference feature vectors to the codewords, and generate the reference histogram corresponding to the reference image.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIGS. 1A through 1D illustrate a method of learning a classifier according to an example embodiment;

FIG. 2A illustrates a method of recognizing a behavior according to an example embodiment;

FIGS. 2B and 2C illustrate a recognition apparatus and a detection apparatus according to example embodiments;

FIGS. 3A and 3B illustrate generation of a codebook according to an example embodiment;

FIG. 4 illustrates an apparatus for learning a classifier according to an example embodiment;

FIGS. 5A and 5B illustrate a dominant direction according to an example embodiment;

FIG. 6C illustrates detection of a feature point based on a contrast of coherence in a dominant direction according to an example embodiment;

FIG. 12 illustrates generation of training images according to an example embodiment;

FIG. 13 illustrates a performance of detecting feature points according to an example embodiment; and FIG. 14 illustrates a performance of feature vectors according to an example embodiment.

DETAILED DESCRIPTION

Figure 1B:
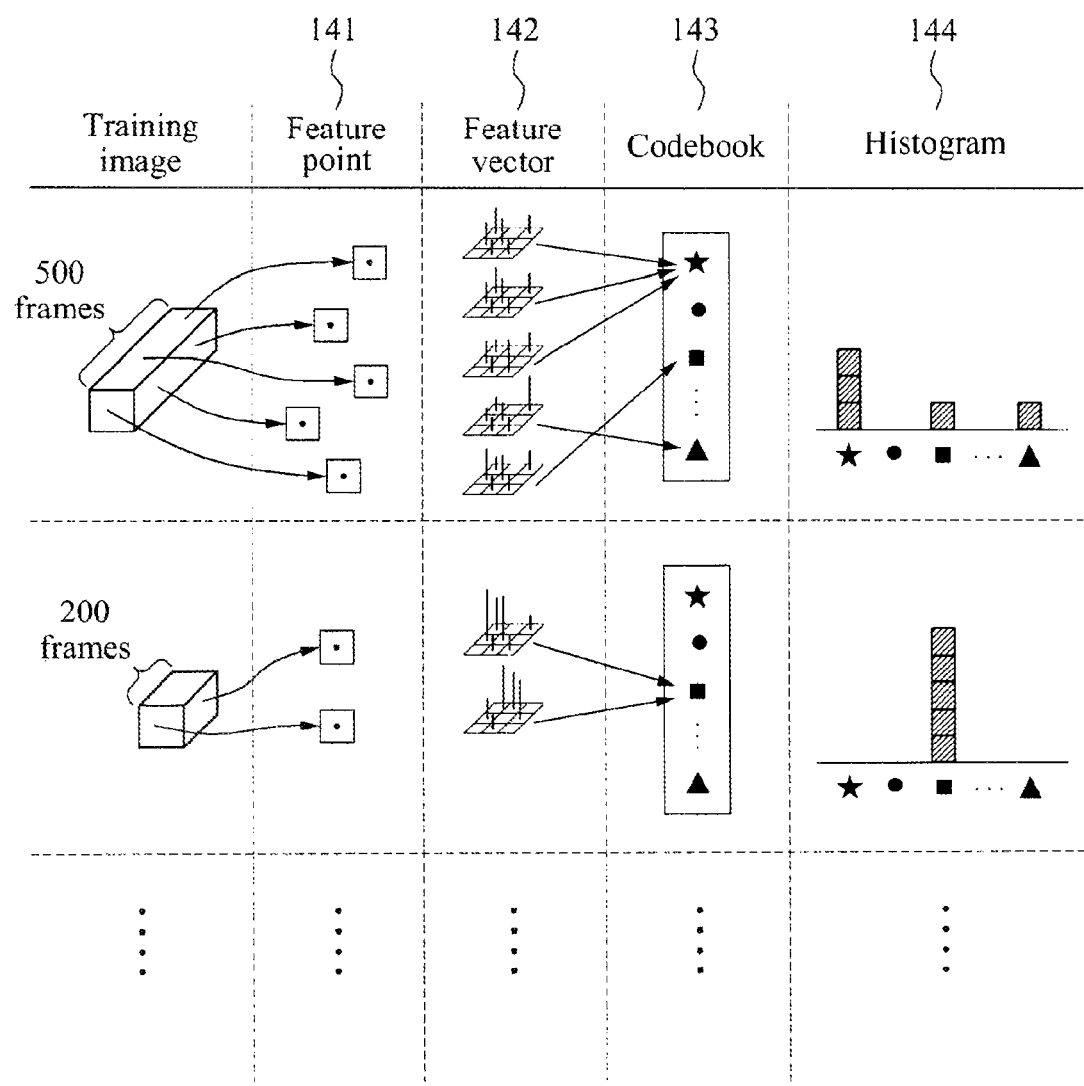

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., a 3D display device).

Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

FIGS. 1A through 1D illustrate a method of learning a classifier according to example embodiments. Referring to FIG. 1A, an apparatus 100 for learning a classifier enables a learning of a classifier using a plurality of training images 121. The plurality of training images 121 includes both a video image and a still image, for example, an image of a performer playing football (known as soccer in the United States), an image of a performer riding a bicycle, an image of a performer swimming, and an image of a performer kissing or hugging another person. When the plurality of training images corresponds to a video image, a single training image includes a plurality of consecutive frames. Here, the plurality of training images 121 has differing numbers of frames and differing resolutions.

The apparatus 100 for learning the classifier includes a histogram generator 110 and a classifier learning unit 130. The histogram generator 110 generates histograms 123 using the plurality of training images 121 and a codebook 122. For example, the histogram generator 110 generates a histogram corresponding to each of the plurality of training images 121 based on the codebook 122. In this example, a single training image is represented as a single codebook-based histogram.

The feature point detector, local feature vector generator, global feature vector generator, codebook mapper and classifier learning unit 130 may be hardware, firmware, hardware executing software or any combination thereof. When at least one of the feature point detector, local feature vector generator, global feature vector generator, codebook mapper and classifier learning unit 130 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the feature point detector, local feature vector generator, global feature vector generator, codebook mapper and classifier learning unit 130. CPUs, DSPs, ASICs and FPGAs may generally be referred to as processors and/or microprocessors.

In the event where at least one of the feature point detector, local feature vector generator, global feature vector generator, codebook mapper and classifier learning unit 130 is a processor executing software, the processor is configured as a special purpose machine to execute the software to perform the functions of the at least one of the feature point detector, local feature vector generator, global feature vector generator, codebook mapper and classifier learning unit 130. In such an embodiment, the processor may include one or more Central Processing Units (CPUs), digital signal processors (DSPs), application-specific-integrated-circuits (ASICs), field programmable gate arrays (FPGAs) computers.

The histogram generator 110 detects a feature point, for example, an interest point or a key point, from a training image. For example, referring to a feature point column 141 of FIG. 1B, a plurality of feature points is detected from a plurality of training images. The histogram generator 110 detects a feature point based on a dominant direction analysis of a space-time gradient distribution. In general, a greater degree of complexity is involved in learning a classifier for recognition of a behavior when a training image is a video image when compared to the training image being a still image. According to example embodiments, achieving performance of a classifier learning unit or a learned classifier is possible when the plurality of training images 121 is a video image having differing numbers of frames and/or resolutions.

The histogram generator 110 calculates a space-time gradient distribution for a plurality of pixels included in an input image. A space-time gradient refers to a gradient with respect to a time and a space, and includes, for example, a gradient in an x axis direction of a predetermined and/or desired frame, a gradient in a y axis direction of the predetermined and/or desired frame, and a gradient in a time axis direction amongst a plurality of frames. When a training image is a still image, the space-time gradient includes the gradient in the x axis direction and the gradient in the y axis direction. As used herein, the space-time gradient is also referred to as a space gradient.

The histogram generator 110 calculates a dominant direction and a dominant direction energy included in a training image based on a dominant direction analysis of a space-time gradient distribution. The histogram generator 110 detects a feature point based on a contrast of coherence in the dominant direction. Descriptions pertaining to the space-time gradient distribution, the dominant direction analysis of the space-time gradient distribution, the dominant direction, the dominant direction energy, and the contrast of coherence in the dominant direction will be provided later.

The histogram generator 110 generates a feature vector corresponding to the detected feature point. For example, referring to a feature vector column 142 of FIG. 1B, feature vectors corresponding to a plurality of detected feature points are generated. The histogram generator 110 generates the feature vectors based on the calculated dominant direction and the dominant direction energy. The histogram generator 110 generates a plurality of feature vectors corresponding to a plurality of feature points because a single training image includes the plurality of feature points.

The histogram generator 110 maps the plurality of feature vectors to the codebook 122, and generates a histogram for the single training image. For example, referring to a codebook column 143 of FIG. 1B, each of the generated feature vectors is mapped to one of codewords included in the codebook 122. Referring to a histogram column 144 of FIG. 1B, the mapping of the plurality of feature vectors generated from the single training image to the codewords of the codebook 122 results in a histogram of a corresponding training image.

Referring to the feature point column 141 of FIG. 1B, a number of feature points detected from a training image having a first number of frames is greater than a number of feature points detected from a training image having a second number of frames when the first number is greater than the second number. Correspondingly, a number of feature vectors to be generated for each of the training images differs. In this example, a histogram generated for each of the training images is normalized because a number of instances in which the feature vectors are mapped to the codewords of the codebook 122 differs for each of the training images.

According to example embodiments, it is possible to analyze a characteristic of an image in a single image unit including a plurality of frames, rather than a single feature point unit or a single frame unit through use of a codebook-based histogram. Also, it is possible to reinforce a discriminative power of a feature vector using the codebook-based histogram. Descriptions pertaining to an operation of generating a codebook and a structure of the codebook will be provided later.

The classifier learning unit 130 enables a learning of a classifier based on widely known methods through an input of a plurality of histograms. The classifier learning unit 130 enables the learning of the classifier based on the plurality of histograms, and outputs a learned parameter 135. As used herein, the learned parameter 135 refers to a result of the classifier being learned, and includes a decision boundary that determines whether an input image belongs to a predetermined and/or desired class, or a weight for each class that determines a class of an input image from among a plurality of classes.

For example, the classifier learning unit 130 inputs the plurality of histograms generated by the histogram generator 110 to a support vector machine (SVM) or a random forest. The SVM is a type of a classification method based on machine learning, the SVM including determining a hyperplane from among a plurality of hyperplanes that has a largest distance from given materials that are divided by the plurality of hyperplanes. The random forest is another type of the classification method based on machine learning, the random forest including determining a reference for classifying given materials using arbitrarily generated decision trees.

Figure 1C:
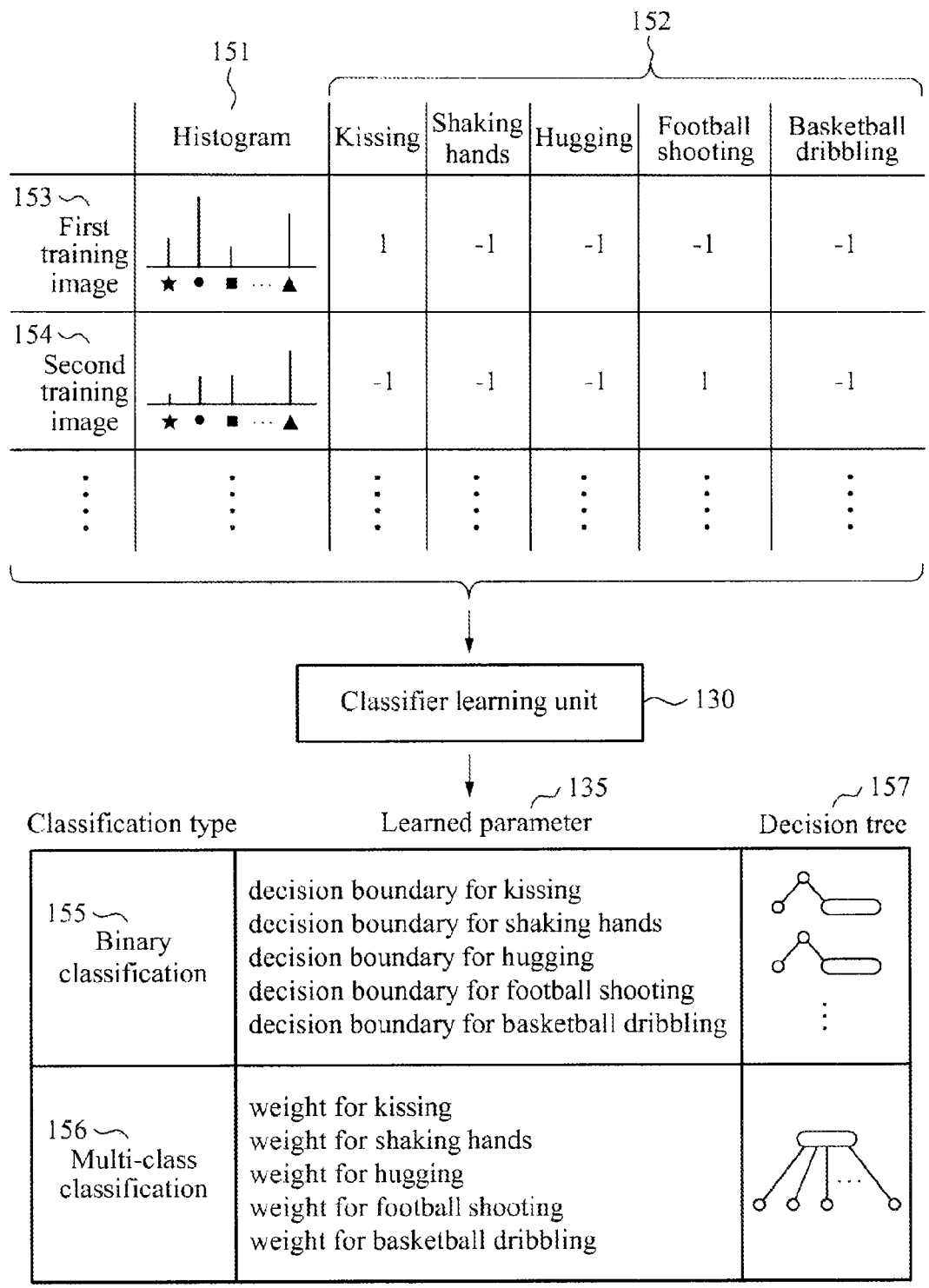

Referring to FIG. 1C, a first training image 153, a second training image 154 and a histogram column 151 may be the same as the training images and the histogram column 144, respectively. The classifier learning unit 130 receives inputs of histograms of the histogram column 151 and values of a behavior label columns 152. The behavior label column 152 includes a plurality of classes. Each of the plurality of classes corresponds to a predetermined and/or desired behavior. For example, the behavior label column 152 includes a kissing class corresponding to a behavior of kissing, a shaking hands class corresponding to a behavior of shaking hands, a hugging class corresponding to a behavior of hugging, a football shooting class corresponding to a behavior of shooting a football, and a basketball dribbling class corresponding to a behavior of dribbling a basketball.

The values of the behavior label column 152 indicate a corresponding class for a plurality of training images. For example, a first training image 153 corresponds to the kissing behavior. In this example, the kissing class in the behavior label columns 152 of the first training image 153 has a value "1", and the rest of the classes have values of "−1". Alternatively, a second training image 154 corresponds to the behavior of shooting the football. In this example, the football shooting class has a value "1" in the behavior label columns 152 of the second training image 154, and the rest of the classes have values of "−1".

A training image may correspond to a plurality of behaviors as necessary. In this example, the behavior label columns 152 include values based on a weight of the plurality of behaviors included in the training image. For example, 75% of the hugging behavior is included in the training image, and 25% of the kissing behavior is included in the training image. In this example, the hugging class has a value "3", and the kissing class has a value of "1". The rest of the classes have values of "−1".

The behavior label columns 152 is also designed to have a value other than "1" or "−1". For example, the behavior label columns 152 is designed to have a logic value TRUE or a logic value FALSE rather than "1" or "−1". A configuration of the behavior label columns 152 may be modified in various forms. For example, the behavior label columns 152 include classes that classify a category of a training image, for example, a fight scene, a love scene, or a chase scene.

The classifier learning unit 130 enables the learning of the classifier based on a plurality of histograms and behavior label values corresponding to the plurality of histograms. The classifier learning unit 130 enables the learning of the classifier based on various classification types. In one example, the classifier learning unit 130 enables the learning of the classifier based on a binary classification 155. In this example, a learned parameter may be a decision boundary for the plurality of classes configuring the behavior label columns 152. The decision boundary based on the binary classification 155 may be implemented in various manners, however, an example embodiment of implementation by a primary function will be provided herein for ease of description and conciseness.

When the decision boundary is implemented by the primary function, a decision boundary for the kissing class corresponds to ($\overrightarrow{a_1}$, $b_1$), a decision boundary for the shaking hands class corresponds to ($\overrightarrow{a_2}$, $b_2$), a decision boundary for the hugging class corresponds to ($\overrightarrow{a_3}$, $b_3$), a decision boundary for the football shooting class corresponds to ($\overrightarrow{a_4}$, $b_4$), and a decision boundary for the basketball dribbling class corresponds to ($\overrightarrow{a_5}$, $b_5$). In this example, $\overrightarrow{a_1}$, $\overrightarrow{a_2}$, $\overrightarrow{a_3}$, $\overrightarrow{a_4}$, and $\overrightarrow{a_5}$ denote vectors in the same dimension as a histogram of a training image. As will be described later, the histogram of the training image is determined by a number of codewords included in a codebook, and as an example, may be a 4000-dimensional vector. Here, $b_1$, $b_2$, $b_3$, $b_4$, and $b_5$ denote scalars for a bias of reliability.

A decision boundary for a plurality of classes is stored in an apparatus for recognizing a behavior, and used to classify a class of an input image. For example, when a histogram generated from an input image is $\vec{x}$, reliability indicating whether the input image belongs to a predetermined and/or desired class is calculated by Equation 1.

$$y_i = \overrightarrow{a_i} \cdot \overrightarrow{x} + b_i \quad \text{[Equation 1]}$$

In Equation 1, $y_i$ denotes reliability with respect to an "i"-th class and ($\overrightarrow{a_i}$, $b_i$) denotes a learned parameter with respect to the "i"-th class. The reliability indicating whether an input image belongs to the "i"-th class is calculated by adding $b_i$ for a bias to an inner product or a dot product of a histogram $\overrightarrow{x}$ of an input image and $\overrightarrow{a_i}$, denoted $\overrightarrow{a_i} \cdot \overrightarrow{x}$.

When reliability with respect to a predetermined and/or desired class is greater than a threshold value, for example, zero, an input image is classified as a corresponding class. When reliability with respect to a predetermined and/or desired class is less than a threshold value, for example, zero, the input image is classified as another class rather than the corresponding class. Referring to a decision tree column 157, a decision tree corresponding to a plurality of decision boundaries classifies the input image into one class and other remaining classes.

In one example, reliability $y_1$ with respect to the kissing class is calculated using the decision boundary ($\overrightarrow{a_1}$, $b_1$) for the kissing class in order to determine whether the input image is classified as the kissing class. When the reliability $y_1$ with respect to the kissing class is greater than zero, the input image is classified as the kissing class, and otherwise, classified as a group other than the kissing class. Alternatively, reliability $y_4$ with respect to the football shooting class is calculated using the decision boundary ($\overrightarrow{a_4}$, $b_4$) for the football shooting class in order to determine whether the input image is classified as the football shooting class. When the reliability $y_4$ with respect to the football shooting class is greater than zero, the input image is classified as the football shooting class, and otherwise, classified as a group other than the football shooting class.

In another example, the classifier learning unit 130 enables the learning of the classifier based on a multi-class classification 156. In this example, a learned parameter is a weight for the plurality of classes configuring the behavior label column 152. For example, a weight for the kissing class corresponds to $\overrightarrow{w_1}$, a weight for the shaking hands class corresponds to $\overrightarrow{w_2}$, a weight for the hugging class corresponds to $\overrightarrow{w_3}$, a weight for the football shooting class corresponds to $\overrightarrow{w_4}$, and a weight for the basketball dribbling class corresponds to $\overrightarrow{w_5}$. In this example, $\overrightarrow{w_1}$, $\overrightarrow{w_2}$, $\overrightarrow{w_3}$, $\overrightarrow{w_4}$, and $\overrightarrow{w_5}$ denote vectors in the same dimension as a histogram of a training image. The histogram of the training image is determined by a number of codewords included in a codebook, and may be, for example, a 4000-dimensional vector.

A weight for a plurality of classes is stored in an apparatus for recognizing a behavior, and used to classify a class of an input image. For example, when a histogram generated from an input image is $\overrightarrow{x}$, reliability indicating whether the input image belongs to a predetermined and/or desired class is calculated by Equation 2.

$$y_i = \overrightarrow{w_i} \cdot \overrightarrow{x} \quad \text{[Equation 2]}$$

In Equation 2, $y_i$ denotes reliability with respect to an "i"-th class and $\overrightarrow{w_i}$ denotes a learned parameter with respect to the "i"-th class. The reliability indicating whether an input image belongs to the "i"-th class is calculated to be a dot product of a histogram $\overrightarrow{x}$ of an input image and $\overrightarrow{w_i}$, denoted $\overrightarrow{w_i} \cdot \overrightarrow{x}$. In this example, the input image is classified as a class having a greatest reliability. Referring to the decision tree column 157, a single decision tree classifies an input image into a plurality of classes. For example, reliability $y_1$ with respect to the kissing class, reliability $y_2$ with respect to the shaking hands class, reliability $y_3$ with respect to the hugging class, reliability $y_4$ with respect to the football shooting class, and reliability $y_5$ with respect to the basketball dribbling class are calculated in order to classify the input image into a predetermined and/or desired class. When the reliability $y_5$ with respect to the basketball dribbling class has a greatest value, the input image is classified as the basketball dribbling class.

Referring to FIG. 1A, the histogram generator 110 further generates a global feature vector aside from a feature vector and a histogram. The histogram generator 110 selects one of a plurality of frames included in a training image, performs a frequency analysis with respect to the selected frame, and generates a global feature vector. The histogram generator 110 arbitrarily selects one of the plurality of frames included in the training image, or selects based on a predetermined and/or desired method, for example, a mid-frame. Alternatively, the histogram generator 110 arbitrarily selects a portion of the plurality of frames included in the training image, or selects based on a predetermined and/or selected method, for example, ten frames having an identical time interval.

The histogram generator 110 generates global feature vectors by performing the frequency analysis for each of the plurality of selected frames, calculates an average of the generated global feature vectors, and generates the global feature vectors corresponding to training images. The histogram generator 110 generates a global feature vector for each of the training images. In this example, a single histogram and a single global feature vector are generated for each of the training images. As used herein, a feature vector corresponding to a feature point is referred to as a local feature vector in order to be differentiated from the global feature vector. The global feature vector is also referred to as a global descriptor, and the local feature vector is also referred to as a local descriptor.

When a global feature vector is generated in the histogram generator 110, the classifier learning unit 130 enables a learning of a single classifier using a histogram and the global feature vector. For example, the classifier learning unit 130 generates and outputs a learned parameter using a pair of (histogram, global feature vector) for a plurality of training images. The learned parameter is used to classify a class of the pair (histogram, global feature vector).

Alternatively, the classifier learning unit 130 enables a learning of a classifier using a histogram, and also enables a learning of an additional classifier using a global feature vector. For example, the classifier learning unit 130 generates and outputs a learned parameter using histograms for a plurality of training images. Moreover, the classifier learning unit 130 generates and outputs an additional learned parameter using global feature vectors for the plurality of training images. The learned parameter is used to classify a class of the histograms, and the additional learned parameter is used to classify a class of the global feature vectors. As will be discussed later, a final class into which an input image is classified is determined by combining the classified class of the histograms and the classified class of the global feature vectors.

According to example embodiments, there is provided a method of efficiently representing a context in an image based on a local feature included in a histogram and a global feature included in a global feature vector.

Figure 1D:
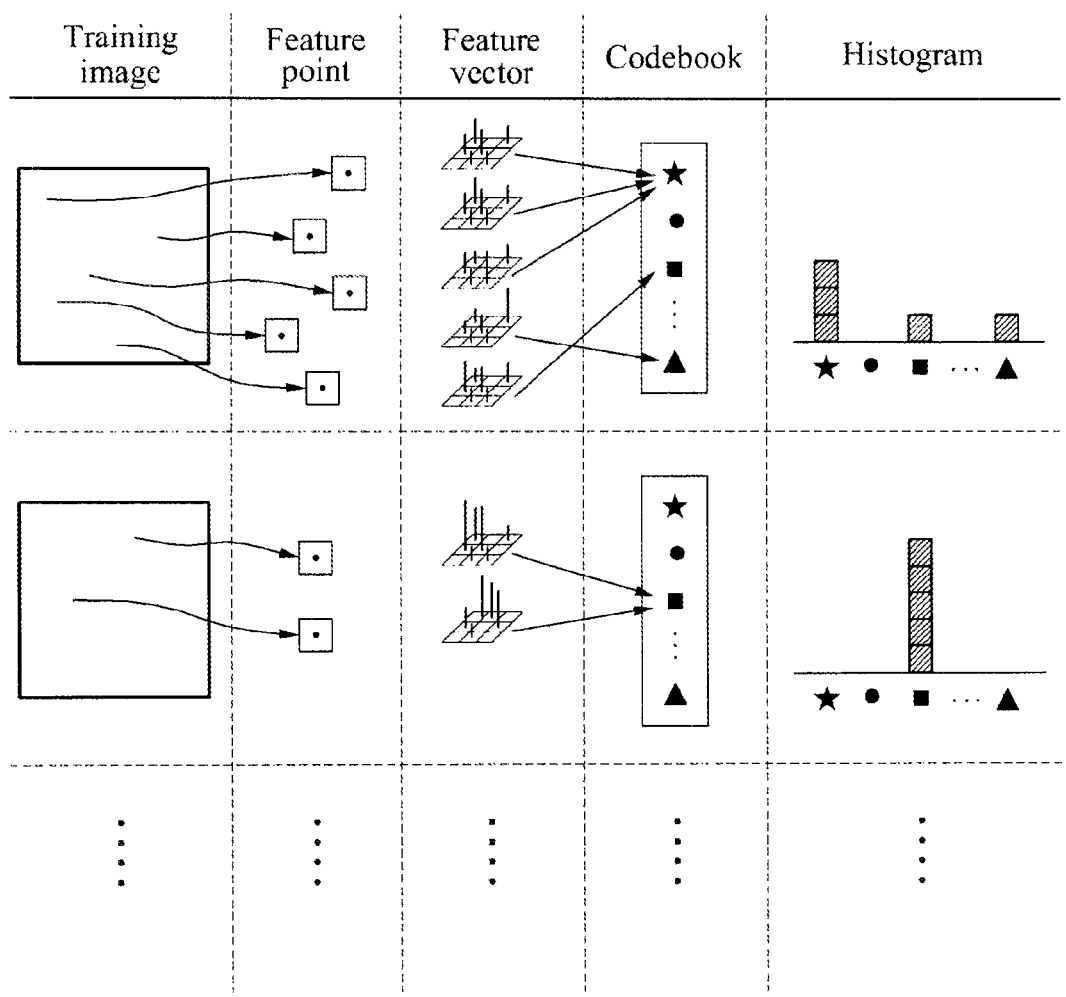

Referring to FIG. 1D, training images are still images. The technical features described with reference to FIGS. 1A through 1C may be directly applied to an instance in which the training images are still images. For example, a plurality of feature points is extracted for each of the training images, feature vectors corresponding to the extracted feature points are generated, and the generated feature vectors are mapped to a codebook. A codebook-based histogram to which the feature vectors are mapped represents each of the training images.

When the training images are still images, the behavior label column 152 of FIG. 1C is substituted for an object label column. In this example, each of the training images corresponds to a predetermined and/or desired object, in lieu of a predetermined and/or desired behavior. By way of example, a first training image corresponds to a vehicle object, and a second training image corresponds to a human face object.

The classifier learning unit 130 of FIG. 1C generates a learned parameter based on a classification type. For example, the classifier learning unit 130 generates decision boundaries for a plurality of objects when a classifier is learned based on a binary classification. Alternatively, the classifier learning unit 130 generates weights for the plurality of objects when the classifier is learned based on a multi-class classification. The decision boundaries and the weights are referred to as learned parameters, and the learned parameters may be used to recognize an object included in an input image.

FIG. 2A illustrates a method of recognizing a behavior according to an example embodiment. Referring to FIG. 2A, an apparatus 200 for recognizing a behavior recognizes a behavior using a real image. The apparatus 200 for recognizing the behavior includes a histogram generator 210, a recognizer 220, and a memory 230. The histogram generator 210 detects a feature point from the real image. The feature point is detected based on a dominant direction analysis of a gradient distribution.

The recognizer 220 may be hardware, firmware, hardware executing software or any combination thereof. When the recognizer 220 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the recognizer 220.

In the event where the recognizer 220 is a processor executing software, the processor is configured as a special purpose machine to execute the software to perform the functions of the recognizer 220. In such an embodiment, the processor may include one or more Central Processing Units (CPUs), digital signal processors (DSPs), application-specific-integrated-circuits (ASICs), field programmable gate arrays (FPGAs) computers.

The histogram generator 210 calculates a space-time gradient distribution for a plurality of pixels, and calculates a dominant direction and a dominant direction energy included in a real image based on the dominant direction analysis of the space-time gradient distribution. The histogram generator 210 detects a feature point based on a contrast of coherence in a dominant direction, and generates a feature vector corresponding to the detected feature point. The histogram generator 210 generates a plurality of feature vectors corresponding to a plurality of feature points because the real image includes the plurality of feature points.

The histogram generator 210 maps a plurality of feature vectors to a codebook, and generates a histogram for a real image. The histogram generator 210 uses a codebook stored in the memory 230. The recognizer 220 recognizes a behavior included in the real image based on the histogram generated by the histogram generator 210 and a learned parameter stored in the memory 230. For example, the recognizer 220 classifies a class of the histogram based on the learned parameter as previously described with reference to FIG. 1C. The recognizer 220 is also referred to as a recognizing unit or a classification unit.

The histogram generator 210 further generates a global feature vector. The histogram generator 210 arbitrarily selects a portion of a plurality of frames included in the real image, or selects based on a predetermined and/or desired rule, and generates a global feature vector by performing a frequency analysis on the selected portion of the frames.

The apparatus 200 for recognizing the behavior inputs the histogram and the global feature vector to the recognizer 220, and recognizes a behavior of a performer in the real image. In this example, the recognizer 220 receives, from the memory 230, a learned parameter generated using both the histogram and the global feature vector. The recognizer 220 classifies a class of a pair (histogram, global feature vector) using the learned parameter.

The apparatus 200 for recognizing the behavior obtains a first output value by inputting the histogram to the recognizer 220. In this example, the recognizer 220 receives the learned parameter generated using the histogram from the memory 230, and classifies the class of the histogram using the learned parameter. The recognizer 220 outputs the class of the classified histogram as the first output. The apparatus 200 for recognizing the behavior obtains a second output value by inputting the global feature vector to the recognizer 220. In this example, the recognizer 220 receives, from the memory 230, an additional learned parameter generated using the global feature vector, and classifies a class of the global feature vector using the additional learned parameter. The recognizer 220 outputs the classified class of the global feature vector as the second output. The apparatus 200 for recognizing the behavior determines a final class through a combination of the first output value and the second output value.

The histogram generator 110 of FIG. 1A and the histogram generator 210 of FIG. 2A operate in substantially the same manner. Descriptions pertaining to the operations of the histogram generator 110 of FIG. 1A and the histogram generator 210 of FIG. 2A will be provided with reference to FIGS. 5A through 9. Hereinafter, a histogram generator refers to any one of the histogram generator 110 of FIG. 1A and the histogram generator 210 of FIG. 2A. As used herein, a feature point detector, a local feature vector generator, a global feature vector generator, and a codebook mapper refer to elements included in one of the histogram generator 110 and the histogram generator 210 of FIG. 2A.

Figure 2C:
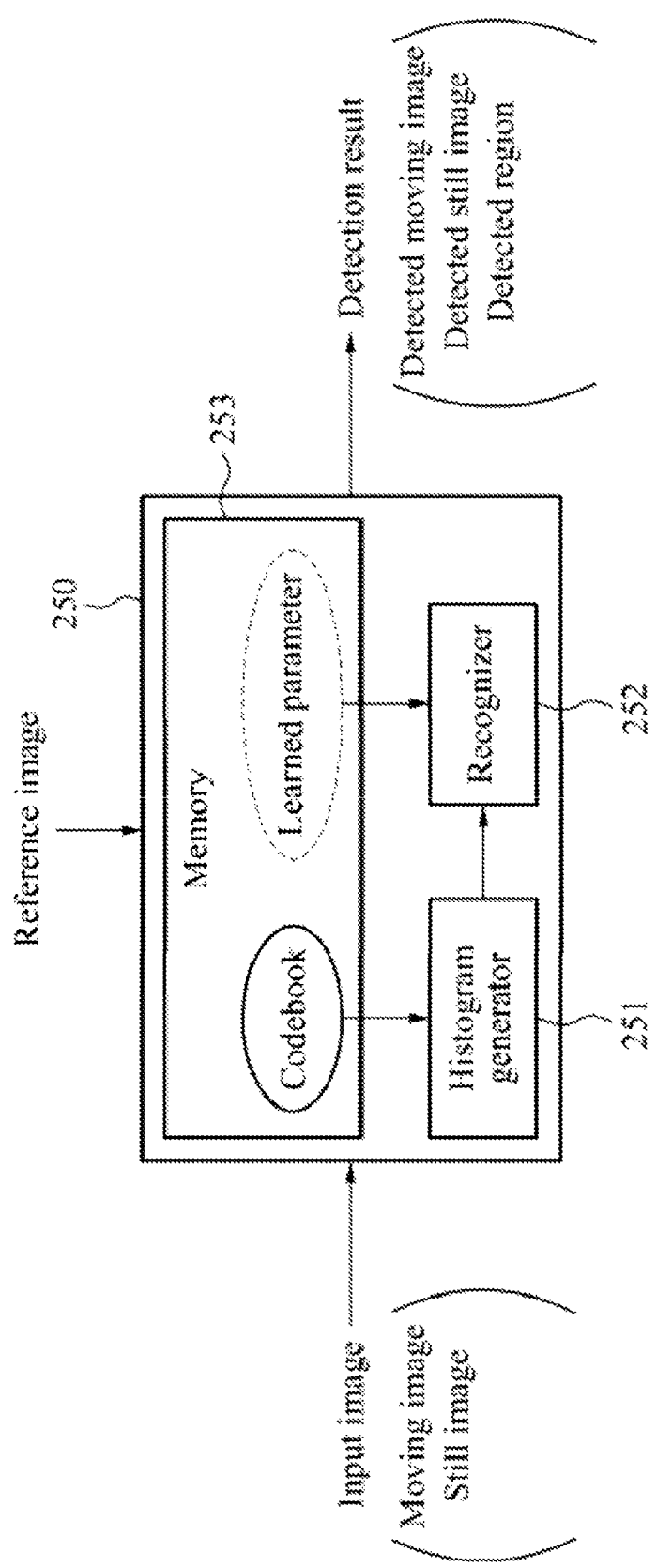

FIGS. 2B and 2C illustrate a recognition apparatus 240 and a detection apparatus 250 according to example embodiments. Referring to FIG. 2B, the recognition apparatus 240 classifies a class of an input image, and recognizes a behavior included in the input image or recognizes an object included in the input image. For example, when the input image is a video image, the recognition apparatus 240 outputs a behavior label indicating a behavior of a performer included in the input image. The behavior label determines whether the input image is recognized as a basketball shooting image or a kissing image. Alternatively, when the input image is a still image, the recognition apparatus 240 outputs an object label indicating an object included in the input image. The object label determines whether the input image is recognized as a face image or a vehicle image, for example. A histogram generator 241, a recognizer 242, and a memory 243 included in the recognition apparatus 240 correspond to the histogram generator 210, the recognizer 220, and the memory 230 of FIG. 2A, respectively.

Referring to FIG. 2C, the detection apparatus 250 detects at least one image corresponding to a reference image from among a plurality of input images. In one example, the plurality of images may be various sports images, and the reference image may be a football dribbling image. In this example, the detection apparatus 250 generates a histogram of the reference image, for example, the football dribbling image, and generates histograms for the plurality of input images, for example, the sports images. In another example, the plurality of input images may be various pictures, and the reference image may be a profile picture of a person. In this example, the detection apparatus 250 generates a histogram of the reference image, for example, the profile picture of the person, and generates histograms for the plurality of input images, for example, the various pictures.

The detection apparatus 250 inputs a histogram of a reference image and a learned parameter to a recognizer 252, and classifies a class of the reference image. In a similar manner, the detection apparatus 250 inputs histograms and learned parameters of a plurality of input images to the recognizer 252, and classifies a class of the plurality of input images. The detection apparatus 250 compares the classified classes, and detects at least one input image classified as a class identical to a class of the reference image. The detection apparatus 250 may not use the learned parameters, depending on a particular case. For example, the detection apparatus 250 directly compares the histogram of the reference image to the histograms of the plurality of input images. The detection apparatus 250 detects at least one input image determined to be similar, in a threshold range, to the histogram of the reference image.

In another example, the detection apparatus 250 detects a region corresponding to the reference image in the input image. The detection apparatus 250 generates a reference histogram using the reference image, and detects a region corresponding to the reference histogram in the input image. By way of example, the input image may be a group picture, and the reference image may be profile picture of a person. The reference image is also referred to as a query image. In this example, the detection apparatus 250 may generate the reference histogram using the reference image, for example, the profile picture of the person. The detection apparatus 250 may scan the input image, for example, the group picture, and detect at least one region determined to be similar, in a predetermined and/or desired range, to the reference histogram.

In still another example, when the input image is a video image, the detection apparatus 250 detects a region localized by the reference image. When the reference image is a video image displaying an act of gleaning, the detection apparatus 250 detects a region corresponding to the act of gleaning from the input video image. A histogram generator 251, the recognizer 252, and a memory 253 included in the detection apparatus 250 correspond to the histogram generator 210, the recognizer 220, and the memory 230 of FIG. 2A, respectively.

FIGS. 3A and 3B illustrate generation of a codebook 325 according to an example embodiment. Referring to FIG. 3A, a codebook generator 300 includes a feature vector generator 310 and a clustering unit 320. The feature vector generator 310 includes a feature point detector and a local feature vector generator. The feature vector generator 310 further includes a global feature vector generator. Operations of the feature point detector, the local feature vector generator, and the global feature vector generator included in the feature vector generator 310 correspond to the operations of the feature point detector, the local feature vector generator, and the global feature vector generator included in the histogram generator 110 of FIG. 1A.

The feature vector generator 310 generates feature vectors 315 from training images 305. For example, the feature vector generator 310 extracts all feature points included in the training images 305, and arbitrarily selects a portion of all the feature points extracted. The feature vector generator 310 generates the feature vectors 315 for the arbitrarily selected portion of the feature points.

The clustering unit 320 may be hardware, firmware, hardware executing software or any combination thereof. When the clustering unit 320 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the clustering unit 320.

In the event where the clustering unit 320 is a processor executing software, the processor is configured as a special purpose machine to execute the software to perform the functions of the clustering unit 320. In such an embodiment, the processor may include one or more Central Processing Units (CPUs), digital signal processors (DSPs), application-specific-integrated-circuits (ASICs), field programmable gate arrays (FPGAs) computers.

The clustering unit 320 clusters the feature vectors 315 to clusters of a predetermined and/or desired number, and generates the codebook 325 including a predetermined and/or desired number of codewords. For example, the clustering unit 320 clusters the feature vectors 315 to K number of clusters by performing a K-means clustering on the feature vectors 315. As used herein, "K" refers to a predetermined and/or desired number of clusters. The clustering unit 320 generates the codebook 325 by collecting values representative of the K number of clusters. In this example, each codeword included in the codebook 325 may be a representative feature vector of a cluster including similar feature vectors.

Referring to FIG. 3B, a codebook generator detects feature points included in training images 340, arbitrarily selects a portion of the detected feature points, clusters local vectors of the selected portions 341, 342, 343, 344, 345, 346, 347, 348, and 349 of the feature points, and generates a plurality of codewords 361, 362, and 363. The codebook generator detects the feature points from the training images 340 based on a dominant direction analysis of a space-time gradient distribution. In one example, the codebook generator may detect seven million feature points from hundreds of millions of training images based on the dominant direction analysis of the space-time gradient distribution. The codebook generator may arbitrarily select ten thousand feature points from the seven million feature points. The codebook generator may generate local feature vectors corresponding to the arbitrarily selected portions 341, 342, 343, 344, 345, 346, 347, 348, and 349 of the feature points. Descriptions pertaining to operation of detecting a feature point and operation of generating a local feature vector will be described later.

The codebook generator clusters the generated local feature vectors. For example, the codebook generator clusters the local feature vectors to K number of clusters 351, 352, and 353 by performing the K-means clustering on the local feature vectors. As used herein, the number K of the clusters 351, 352, and 353 corresponds to a number of codewords 361, 362, and 363 included in a codebook 360. The codeword 361 is a feature vector representative of the cluster 351, the codeword 362 is a feature vector representative of the cluster 352, and the codeword 363 is a feature vector representative of the cluster 353.

In one example, K may be 4000. The codebook generator may cluster ten thousand local feature vectors to 4000 clusters. In this example, the codebook 360 may include 4000 codewords representative of the 4000 clusters. Accordingly, each of the codewords included in the codebook 360 may correspond to a characteristic of a local feature vector representative of each of the clusters.

FIG. 4 illustrates an apparatus 400 for learning a classifier according to example embodiments. Referring to FIG. 4, the apparatus 400 for learning the classifier includes a codebook generator 410, a histogram generator 420, and a classifier learning unit 430. The codebook generator 410 includes a feature vector generator 415 and a clustering unit 411. The histogram generator 420 includes the feature vector generator 415 and a codebook mapper 421. The codebook generator 410 and the histogram generator 420 share the feature vector generator 415.

The histogram generator 420 and the classifier learning unit 430 directly correspond to the histogram generator 110 and the classifier learning unit 130 of FIG. 1A. The codebook generator 410 directly corresponds to the codebook generator 300 of FIG. 3A. For example, the codebook generator 410 receives inputs of training images, and outputs a codebook. The histogram generator 420 receives inputs of the training images and the codebook, and outputs histograms. The classifier learning unit 430 receives inputs of the histograms, outputs a learned parameter.

Figure 5B:
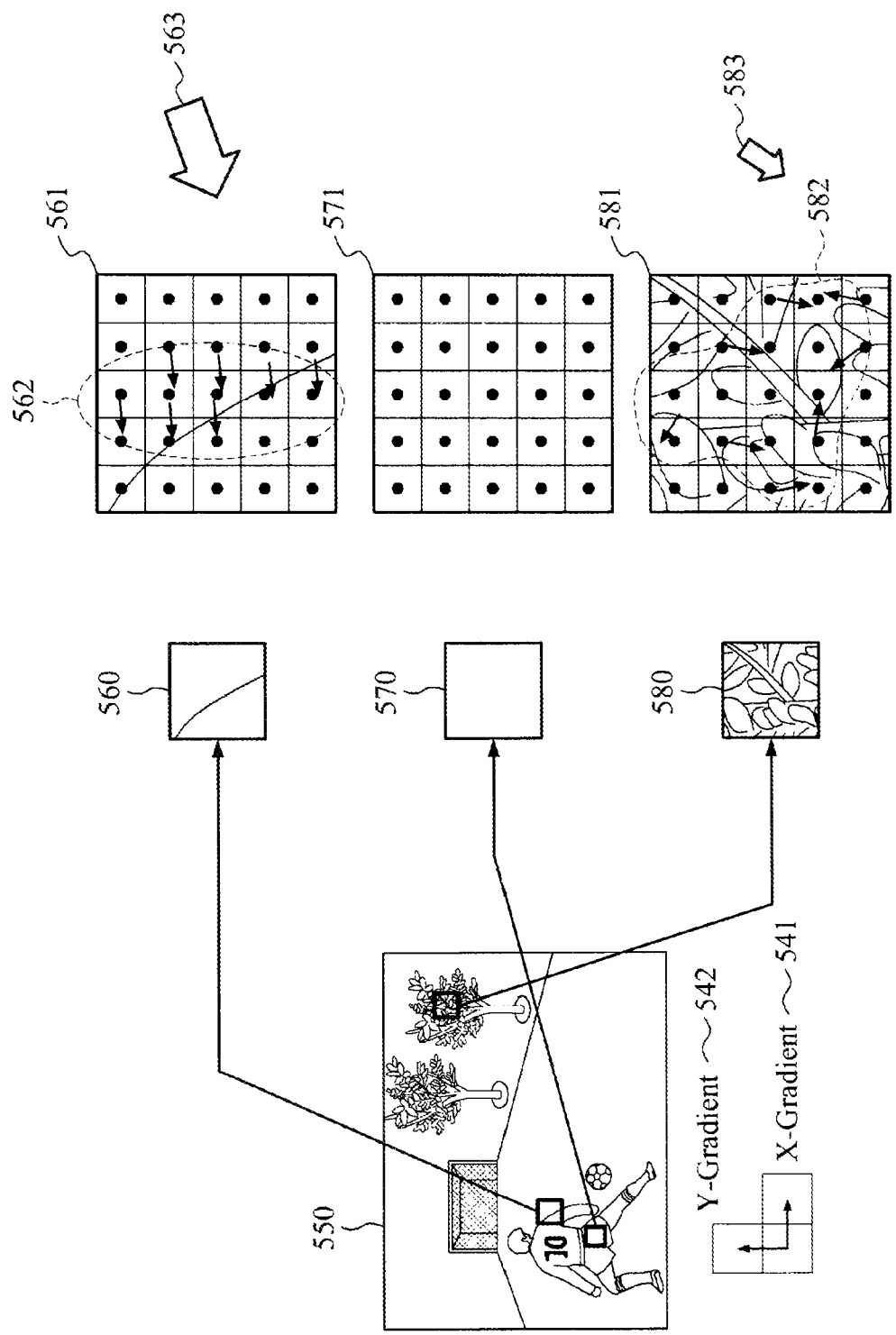

Hereinafter, operation of detecting a feature point and operation of generating a feature vector will be described with reference to FIGS. 5A through 9. FIGS. 5A and 5B illustrate a dominant direction according to an example embodiment.

Referring to FIG. 5A, an input image 500 refers to a video image including a plurality of frames, and each of the plurality of frames included in the input image 500 is classified into a performer playing football and a background such as a football goal post or trees. When a behavior is recognized using the input image 500, a performer-based analysis, for example, analyzing pixels corresponding to the performer, is more preferable than a background-based analysis, for example, analyzing pixels corresponding to the background, from among a plurality of pixels included in the input image 500. As used herein, a pixel closely associated with a behavior to be recognized refers to a feature point. For example, the feature point includes a pixel corresponding to a performer. However, when the input image 500 includes noise or brightness varies for the plurality of frames included in the input image 500, precise detection of the feature point from the input image 500 is difficult. According to example embodiments, detection of the feature point from the input image 500 is possible based on the dominant direction.

The dominant direction is related to a distribution of space-time gradients. As used herein, a space-time gradient refers to a gradient with respect to a time and a space. For example, the space-time gradients includes a gradient 541 in an x axis direction in a single frame, a gradient 542 in a y axis direction in a single frame, a gradient 543 in a time axis direction amongst the plurality of frames. The gradient 541 in the x axis direction indicates a degree of brightness changing in the x axis direction, the gradient 542 in the y axis direction indicates a degree of brightness changing in the y axis direction, and the gradient 543 in the time axis direction indicates a degree of brightness changing amongst a plurality of consecutive frames.

The dominant direction is calculated from the distribution of the space-time gradients distributed in a patch in a predetermined and/or desired size. In one example, a patch 510 corresponding to a performer playing football has a clear boundary. Referring to a patch 511 expanded from the patch 510, the space-time gradients of the plurality of pixels included in the patch 510 have a clear directivity in a vicinity of the boundary as shown in a group 512. A plurality of vectors included in the group 512 refers to a space-time gradient in a corresponding pixel. A starting point for the plurality of vectors is disposed at the corresponding pixel, and the plurality of vectors faces towards a brighter direction than the corresponding pixel. Although the plurality of vectors included in the group 512 is illustrated as two-dimensional (2D) for ease of description, the plurality of vectors included in the group 512 is a three-dimensional (3D) vector including the gradient 543 in the time axis direction.

A dominant direction of the patch 510 is calculated from the distribution of the space-time gradients for the plurality of pixels included in the patch 510. For example, the dominant direction of the patch 510 is calculated from a combination of the plurality of vectors included in the group 512. The dominant direction of the patch 510 is a dominant direction indicated by the plurality of vectors included in the group 512. The dominant direction of the patch 510 is represented by an arrow 513. A direction of the arrow 513 indicates a dominant direction, and a thickness of the arrow 513 indicates an energy of the dominant direction. The energy of the dominant direction represents a magnitude of the dominant direction. The energy of the dominant direction is also referred to as a strength of coherence in the dominant direction. For example, a level of the strength of coherence is verified to be high in the dominant direction of the patch 510 because the space-time gradients included in the patch 510 have a consistent directivity in the vicinity of the boundary.

In another example, a particular brightness change is absent in a patch 520 in a flat region. Referring to a patch 521 expanded from the path 520, a space-time gradient having a meaningful value is absent in the patch 520. In this example, a dominant direction of the patch 520 is verified to be absent.

In still another example, a patch 530 in a highly textured region includes an irregular brightness change. Referring to a patch 531 expanded from the patch 530, space-time gradients of a plurality of pixels included in the patch 530 have an irregular direction as shown in a group 532. The dominant direction of the patch 530 is calculated from the distribution of the space-time gradients for the plurality of pixels included in the patch 530. For example, as described above, the dominant direction of the patch 530 is calculated by a combination of a plurality of vectors included in a group 532, and corresponds to a dominant direction indicated by the plurality of vectors. However, in contrast to the patch 510, the plurality of vectors included in the group 532 of the patch 530 indicates differing directions. In this example, a level of the strength of coherence is verified to be low in the dominant direction of the patch 530. The dominant direction of the patch 530 is represented by an arrow 533, and a thickness of the arrow 533 being thinner than the thickness of the arrow 513 indicates that an energy of the dominant direction of the patch 530 is less than the energy of the dominant direction of the patch 510.

A feature point detector selects the patch 510 from among the patches 510, 520, and 530 to detect a feature point. The feature point detector selects a patch having a clear dominant direction. Alternatively, the feature point detector selects a patch having a clear boundary. As will be described later, the feature point detector selects a patch having a substantially great contrast of coherence in a dominant direction. Descriptions pertaining to the contrast of coherence in the dominant direction will be provided later. The feature point detector detects a pixel corresponding to the selected patch 510 as the feature point. The pixel corresponding to the patch 510 refers to a pixel disposed at a center of the patch 510.

Referring to FIG. 5B, an input image 550 is a still image such as a picture, and is classified into a performer playing football, and a background such as a football goal post or trees. When the input image 550 is a still image such as a picture, a dominant direction is related to a distribution of space gradients. A space gradient refers to a gradient with reference to a space, and for example, includes the gradient 541 in an x axis direction and the gradient 542 in a y axis direction.

The dominant direction is calculated from a distribution of space gradients distributed in a patch in a predetermined and/or desired size. In one example, a patch 560 corresponding to a performer playing football has a clear boundary. Referring to a patch 561 expanded from the patch 560, space gradients of a plurality of pixels included in the patch 560 have a clear directivity in a vicinity of the boundary as shown in a group 562. A plurality of vectors included in the group 562 refers to a space gradient in a corresponding pixel. A start point of the plurality of vectors is disposed at the corresponding pixel, and the plurality of vectors faces towards a brighter direction than the corresponding pixel.

A dominant direction of the patch 560 is calculated from the distribution of the space gradients for the plurality of pixels included in the patch 560. For example, the dominant direction of the patch 560 is calculated from a combination of the plurality of vectors included in the group 562. The dominant direction of the patch 560 is a dominant direction indicated by the plurality of vectors included in the group 562. The dominant direction of the patch 560 is represented by an arrow 563.

In another example, a particular brightness change is absent in a patch 570 in a flat region. Referring to a patch 571 expanded from the path 570, a space gradient having a meaningful value is absent in the patch 570. In this example, a dominant direction of the patch 570 is verified to be absent.

In still another example, a patch 580 in a highly textured region includes an irregular brightness change. Referring to a patch 581 expanded from the patch 580, space gradients of a plurality of pixels included in the patch 580 have an irregular direction as shown in a group 582. The dominant direction of the patch 580 is calculated from the distribution of the space gradients for the plurality of pixels included in the patch 580. For example, as described above, the dominant direction of the patch 580 is calculated from a combination of a plurality of vectors included in the group 582, and corresponds to a dominant direction indicated by the plurality of vectors. However, in a dissimilar manner to the patch 560, the plurality of vectors included in the group 582 of the patch 580 indicates differing directions. In this example, a level of the strength of coherence is verified to be low in the dominant direction of the patch 580. The dominant direction of the patch 580 is represented by an arrow 583.

The feature point detector selects the patch 560 from among the patches 560, 570, and 580 to detect a feature point. The feature point detector selects a patch having a clear dominant direction. Alternatively, the feature point detector selects a patch having a clear boundary. As will be described later, the feature point detector selects a patch having a substantially great contrast of coherence in a dominant direction. Descriptions pertaining to the contrast of coherence in the dominant direction will be provided later. The feature point detector detects a pixel corresponding to the selected patch 560 as the feature point. The pixel corresponding to the patch 560 refers to a pixel disposed at a center of the patch 560.

Prior to describing an operation of detecting a feature point and an operation of generating a feature vector with reference to FIGS. 6A through 7, how various regions are used will be discussed briefly. According to an example embodiments, various regions are set, for example, including a region for calculating a space-time gradient of a pixel, a region for calculating a dominant direction of a pixel and a dominant direction energy by performing an Eigen analysis on a structure tensor, a region for detecting a feature point based on a dominant direction contrast, and a region for generating a local feature vector based on quantization of a dominant direction and accumulation of the dominant direction energy.

For example, the region for calculating the space-time gradient of the pixel is set to include eight adjacent pixels in a vicinity of the pixel and at least one adjacent pixel in a previous frame. The region for calculating the dominant direction of the pixel and the dominant direction energy is set to be a region in a size of a 3×3 pixel region including the pixel. The region for detecting the feature point is set to be a region in a size of a 5×5 pixel region. The region for generating the local feature vector is set to be a region in a size of a 5×5 pixel region including a feature point.

The aforementioned settings are subject to various modifications. For example, the region for calculating the dominant direction of the pixel and the dominant direction energy, the region for detecting the feature point, and the region for generating the local feature vector may be set to be a region in a size of a 3×3 pixel region.

Figure 6A:
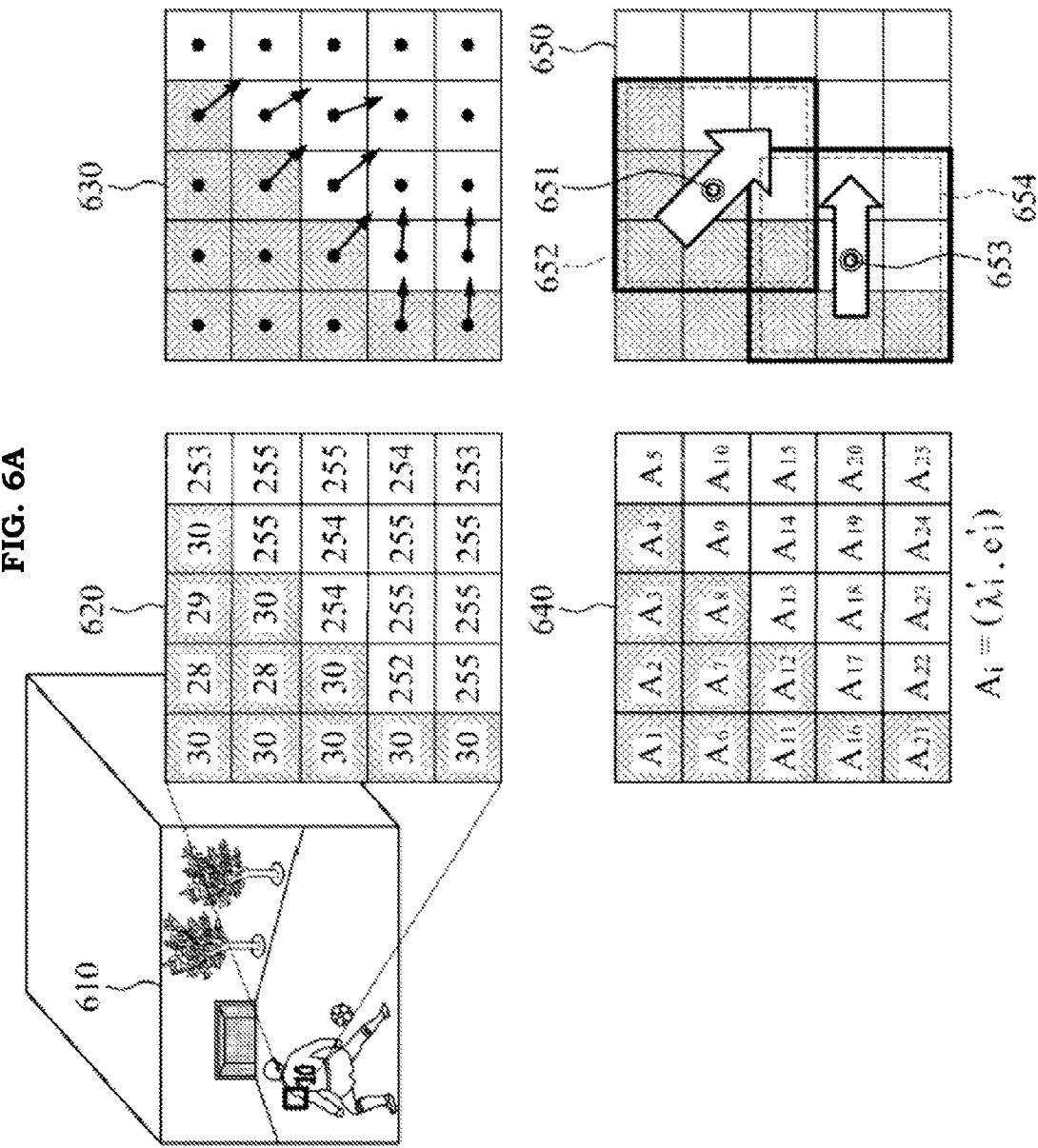
FIG. 6A illustrates a dominant direction analysis of a space-time gradient distribution according to an example embodiment.

FIG. 6A illustrates a dominant direction analysis of a space-time gradient distribution according to example embodiments. Referring to FIG. 6A, a feature point detector calculates space-time gradients of a plurality of pixels included in an input image 610. The feature point detector uses a frame to which a predetermined and/or selected pixel belongs, hereinafter also referred to as a current frame, and a frame directly prior to the current frame, hereinafter also referred to as a previous frame, in order to calculate a space-time gradient of the predetermined and/or selected pixel. For example, the feature point detector may use the aforementioned "region for calculating the space-time gradient of the pixel." The feature detector calculates a space gradient using pixels adjacent to the predetermined and/or selected pixel in the current frame. The feature point detector calculates the space gradient of the predetermined and/or selected pixel using a brightness difference between the plurality of adjacent pixels and the predetermined and/or selected pixel. The feature point detector calculates a time gradient using at least one pixel adjacent to a predetermined and/or selected pixel in the previous frame. The feature point detector calculates the time gradient of the predetermined and/or selected pixel using a brightness difference between the at least one adjacent pixel and the predetermined and/or selected pixel.

Referring to a patch 620 included in the input image 610, a brightness of pixels disposed at a top left is low and a brightness of pixels disposed at a bottom right is high. In this example, space-time gradients of a plurality of pixels included in the patch 620 are represented by a matrix 630. A plurality of vectors included in the matrix 630 refers to a space-time gradient of a corresponding pixel. A start point of the plurality of vectors included in the matrix 630 is disposed at the corresponding pixel, and the plurality of vectors faces a brighter direction than the corresponding pixel. Although the plurality of vectors included in the matrix 630 is illustrated in 2D for ease of description, the plurality of vectors included in the matrix 630 is a 3D vector including a gradient in an x axis direction, a gradient in a y axis direction, and a gradient in a time axis direction.

Figure 6B:
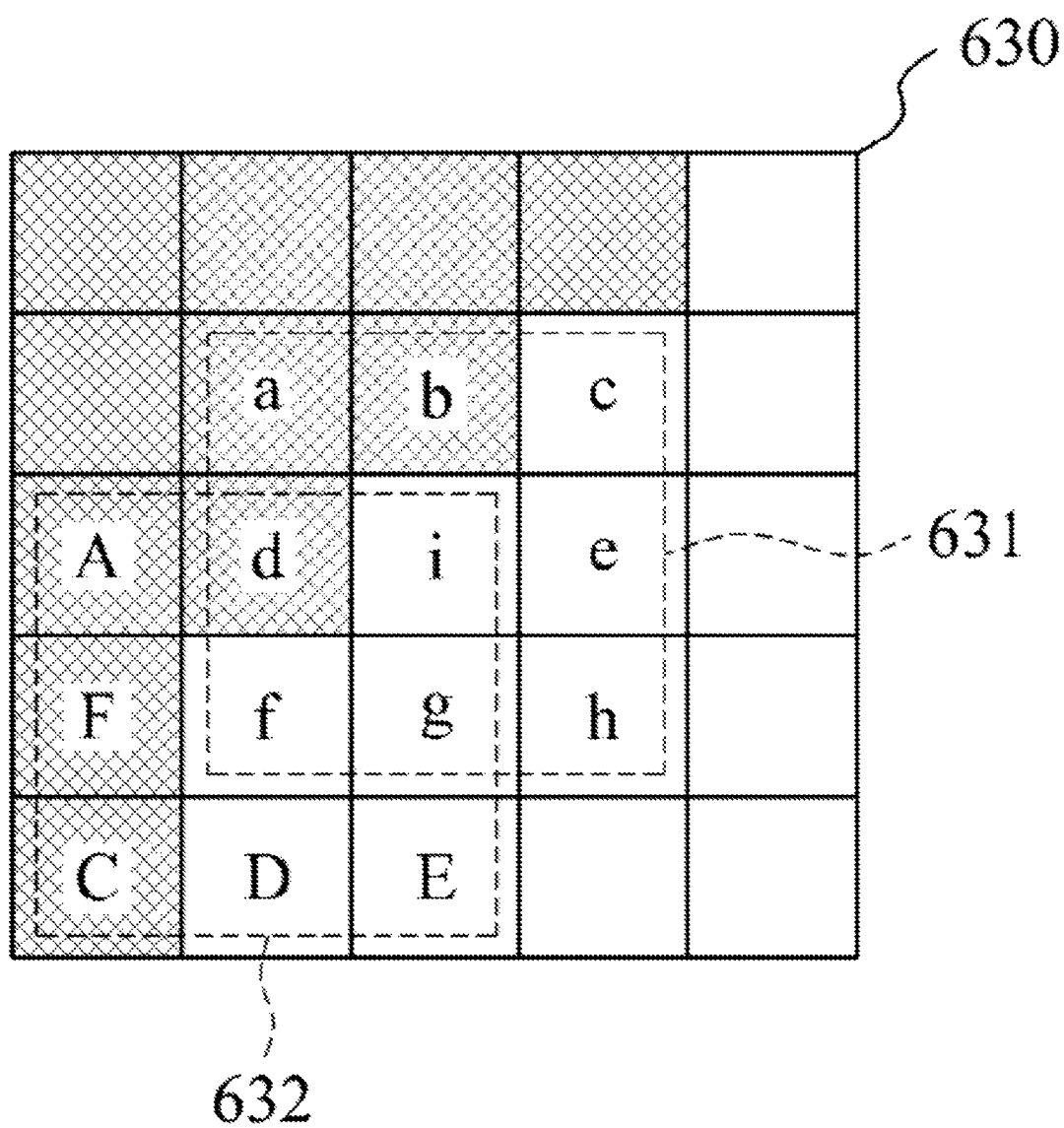
FIG. 6B illustrates calculation of a structure tensor according to an example embodiment.

FIG. 6B illustrates calculation of a structure tensor according to example embodiments. A feature point detector calculates a structure tensor using a calculated space-time gradient. The structure tensor is represented by Equation 3.

$$S_i = \begin{bmatrix} \sum_B G_x^2 & \sum_B G_x G_y & \sum_B G_x G_t \\ \sum_B G_x G_y & \sum_B G_y^2 & \sum_B G_y G_t \\ \sum_B G_x G_t & \sum_B G_y G_t & \sum_B G_t^2 \end{bmatrix} \quad \text{[Equation 3]}$$

In Equation 3, "i" denotes an index of a pixel, $G_x$ denotes a gradient in an x axis direction in an "i"-th pixel, $G_y$ denotes a gradient in a y axis direction in the "i"-th pixel, and $G_t$ denotes a gradient in a time axis in the "i"-th pixel. $G_t$ is calculated using consecutive frames, for example, a "t"-th frame and a (t−1)-th frame. Alternatively, $G_t$ is calculated using non-consecutive frames, for example, a "t"-th frame and a (t−N)-th frame. As used herein, "N" refers to a positive integer greater than "1".

"B" denotes a block to calculate a structure tensor, or a window to calculate a dominant direction. As used herein, "B" corresponds to the aforementioned "region for calculating the dominant direction of the pixel and the dominant direction energy. "B" may be provided in various predetermined and/or desired sizes. For example, "B" may be set to be an image block in a size of a 3×3 pixel region including an "i"-th pixel or an image block in a size of a 5×5 pixel region including the "i"-th pixel. In this example, the size of "B" is determined to be (number of pixels in x axis direction) x times (number of pixels in y axis direction) y.

Referring to the matrix 630 of FIG. 6B, when "B" is set to be a region in a size of a 3×3 pixel region, a structure tensor of a pixel "i" is calculated using space-time gradients of pixels (a, b, c, d, i, e, f, g, h) in a block 631. A structure tensor of a pixel "f" is calculated using space-time gradients of pixels (A, d, i, F, f, g, C, D, E) in a block 632.

The feature point detector calculates a dominant direction and a dominant direction energy of a space-time gradient distribution by performing an Eigen analysis with respect to a structure tensor. For example, the feature point detector calculates an eigenvalue $\lambda_i$ and an eigenvector $e_i$ that satisfy "$S_i e_i = \lambda_i e_i$." When $S_i$ is a 3×3 matrix as shown in Equation 3, three eigenvalues $\lambda_i = [\lambda^1_i \ \lambda^2_i \ \lambda^3_i]$ are calculated with respect to $S_i$. Three eigenvectors $e_i = [e^1_i \ e^2_i \ e^3_i]$ are calculated with respect to $S_i$. In this example, $\lambda^1_i$ corresponds to $e^1_i$, $\lambda^2_i$ corresponds to $e^2_i$, $\lambda^3_i$ corresponds to $e^3_i$, and $\lambda^1_i > \lambda^2_i > \lambda^3_i$.

The feature point detector calculates a pair of a maximum eigenvalue with respect to a plurality of pixels and an eigenvector corresponding to the maximum eigenvalue. The pair of the eigenvalue calculated for the plurality of pixels is represented by a matrix 640 of FIG. 6A. Referring to the matrix 640, a pair $\lambda^1_i$ for an "i"-th pixel corresponds to ($\lambda^1_i$, $e^1_i$). In this example, a maximum eigenvalue $\lambda^1_i$ corresponds to a dominant direction energy, and an eigenvector $e^1_i$ corresponding to the maximum eigenvalue corresponds to a dominant direction.

The pair for the "i"-th pixel may be modified in various manners as necessary. In one example, the pair $A_i$ for the "i"-th pixel may correspond to (co, $e^1_i$). In this example, a strength "co" of coherence is calculated to be a difference between eigenvalues in a predetermined and/or desired relationship, such as ($\lambda^1_i - \lambda^2_i$) or ($\lambda^1_i - \lambda^3_i$). The strength "co" of coherence is also referred to as a dominant direction energy.

Figure 6C:
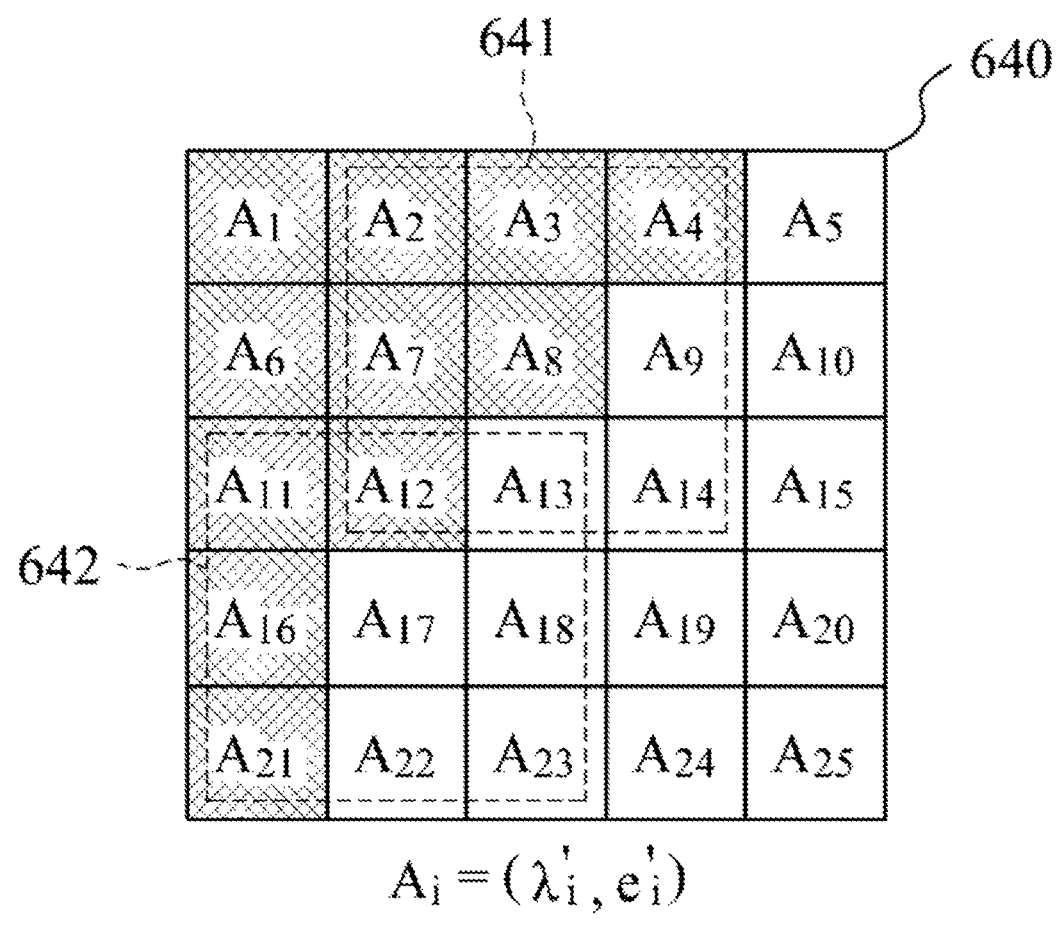

FIG. 6C illustrates detection of a feature point based on a contrast of coherence in a dominant direction according to example embodiments. Referring to FIG. 6C, a feature point detector detects a feature point based on a contrast of coherence in a dominant direction. For example, the feature point detector calculates $D_i$ for each pixel based on Equation 4.

$$D_i = \sum_{j \in W_i} |\lambda^1_i - \lambda^1_j| \quad \text{[Equation 4]}$$

In Equation 4, $W_i$ denotes a window to determine whether an "i"-th pixel is a feature point, or a window to calculate a dominant direction contrast, and $D_i$ is the contrast of coherence. As used herein, $W_i$ corresponds to the aforementioned "region for detecting the feature point". $W_i$ may be provided in various predetermined and/or desired sizes. For example, $W_i$ may be set to be an image block in a size of a 3×3 pixel region including an "i"-th pixel, an image block in a size of a 5×5 pixel region including the "i"-th pixel, or an image block in a size of a 7×7 pixel region including the "i"-th pixel. In this example, the size of $W_i$ is verified to be (number of pixels in x axis direction) x times (number of pixels in y axis direction) y.

$D_i$ is calculated by a sum of differences between a maximum eigenvalue of an "i"-th pixel and maximum eigenvalues of neighboring pixels in $W_i$. Referring to the matrix 640 of FIG. 6C, $D_8$ of an eighth pixel is calculated by a sum of differences between $\lambda^1_8$ and maximum eigenvalues of neighboring pixels in a window 641. Alternatively, $D_{17}$ of a seventeenth pixel is calculated by a sum of differences between $\lambda^1_{17}$ and maximum eigenvalues of neighboring pixels in a window 642.

In another example, when the pair $A_i$ for the "i"-th pixel corresponds to (co, $e^1_i$), the feature point detector calculates $D_i$ in each pixel based on Equation 5.

$$D_i = \sum_{j \in W_i} |co_i - co_j| \quad \text{[Equation 5]}$$

The feature point detector determines the "i"-th pixel to be a feature point when $D_i$ calculated based on Equation 4 or Equation 5 is greater than a threshold value $\tau$. For example, the feature point detector determines an eighth pixel to be a feature point based on a determination that $D_8 > \tau$. The feature point detector determines a seventeenth pixel to be a feature point based on a determination that $D_{17} > \tau$. The feature point detector determines a nineteenth pixel to be a feature point based on a determination that $D_{19} < \tau$. Alternatively, the feature point detector determines the "i"-th pixel to be a feature point when $D_i$ belongs to top N %, for example, top 2%.

Referring to FIG. 6A, the feature point detector detects a pixel 651 and a pixel 653 to be feature points from a matrix 650. The pixel 651 corresponds to an eighth pixel included in the matrix 640 of FIG. 6C, and the pixel 653 corresponds to a seventeenth pixel included in the matrix 640 of FIG. 6C. A window 652 for the pixel 651 corresponds to the window 641 of FIG. 6C, and a window 654 for the pixel 653 corresponds to the window 642 of FIG. 6C. The feature point detector detects a plurality of feature points included in an input image through the aforementioned operations.

Figure 6D:
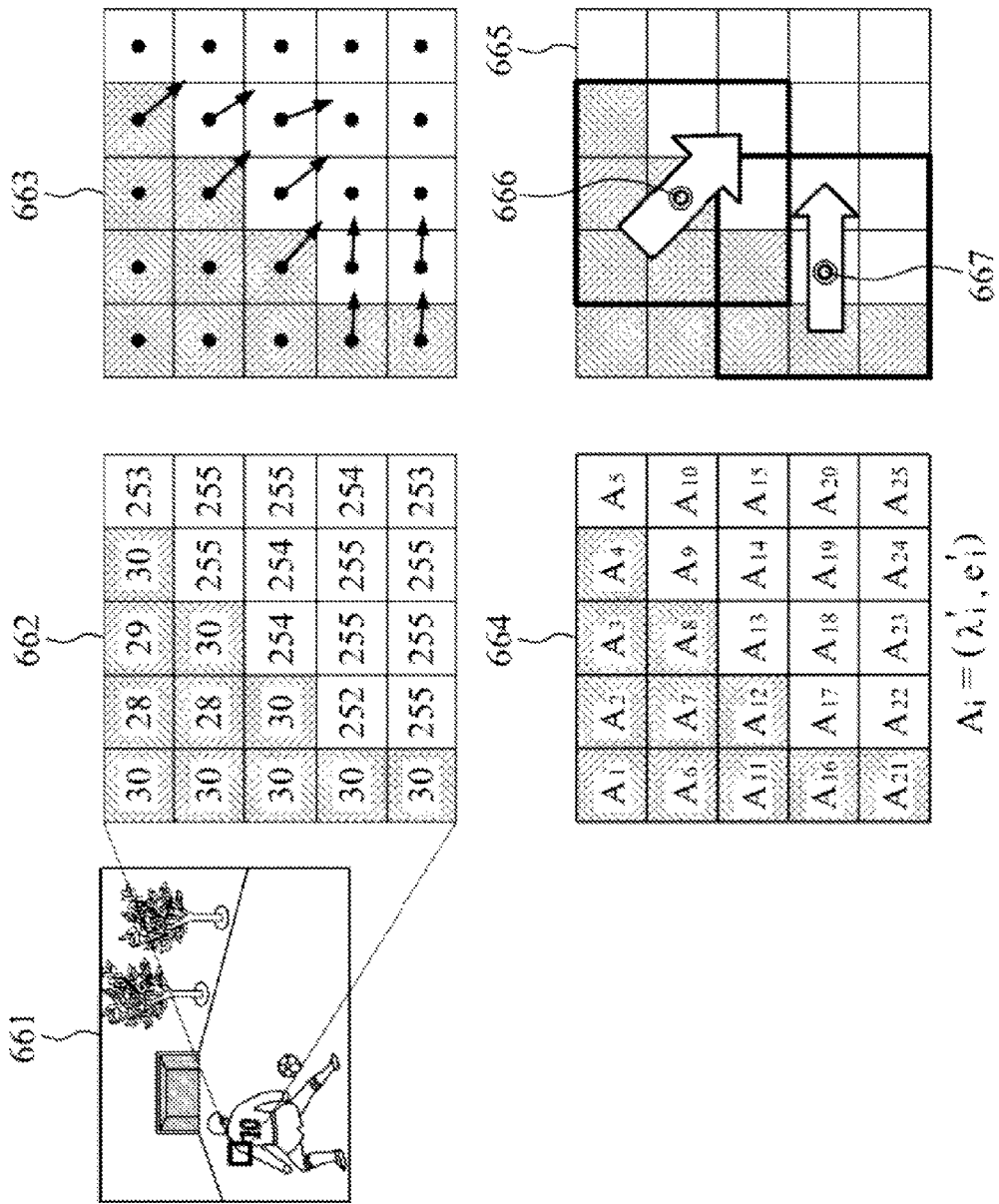
FIG. 6D illustrates a dominant direction analysis of a space gradient distribution according to an example embodiment.

FIG. 6D illustrates a dominant direction analysis of a space-time gradient distribution according to example embodiments. Referring to FIG. 6D, an input image 661 is a still image, for example, a picture. When the input image is a still image rather than a video image, a feature point detector detects a feature point based on a dominant direction analysis of a space gradient distribution in lieu of a dominant direction analysis of a space-time gradient distribution.

The feature point detector calculates space gradients of a plurality of pixels included in an input image. A space gradient refers to a 2D vector including a gradient $G_x$ in an x axis and a gradient $G_y$ in a y axis direction. In a patch 662 included in the input image 661, a space gradient for each pixel is represented by a matrix 663. A plurality of arrows illustrated in the matrix 663 refers to a 2D vector.

The feature point detector calculates a structure tensor using the calculated space gradients. In this example, the structure tensor is given by Equation 6.

$$S_i = \begin{bmatrix} \sum_B G_x^2 & \sum_B G_x G_y \\ \sum_B G_x G_y & \sum_B G_y^2 \end{bmatrix}$$ [Equation 6]

In Equation 6, "i" denotes an index of a pixel, $G_x$ denotes a gradient in an x axis direction in an "i"-th pixel, and $G_y$ denotes a gradient in a y axis direction in the "i"-th pixel. "B" denotes a block to calculate a structure tensor, or a window to calculate a dominant direction. As used herein, "B" corresponds to the aforementioned "region for calculating the dominant direction of the pixel and the dominant direction energy."

The feature point detector calculates a dominant direction and a dominant direction energy of a space gradient distribution by performing an Eigen analysis on a structure tensor. For example, the feature point detector calculates an eigenvalue $\lambda_i$ and an eigenvector $e_i$ that satisfy "$S_i e_i = \lambda_i e_i$." When $S_i$ is a 2×2 matrix as shown in Equation 6, two eigenvalues $\lambda_i = [\lambda^1_i \ \lambda^2_i]$ are calculated with respect to $S_i$, and two eigenvectors $e_i = [e^1_i \ e^2_i]$ are calculated with respect to $S_i$. In this example, $\lambda^1_i$ corresponds to $e^1_i$, $\lambda^2_i$ corresponds to $e^2_i$, and $\lambda^1_i > \lambda^2_i$.

The feature point detector calculates a pair of a maximum eigenvalue with respect to a plurality of pixels and an eigenvector corresponding to the maximum eigenvalue. The pair of the eigenvector calculated for the plurality of pixels is represented by a matrix 664. Referring to the matrix 664, a pair $A_i$ for an "i"-th pixel corresponds to $(\lambda^1_i, e^1_i)$. In this example, a maximum eigenvalue $\lambda^1_i$ corresponds to a dominant direction energy, and an eigenvector $e^1_i$ corresponding to the maximum eigenvalue corresponds to a dominant direction.

The feature point detector detects a feature point based on a contrast of coherence in a dominant direction. For example, the feature point detector calculates $D_i$ for a plurality of pixels based on Equation 4.

The pair $A_i$ for the "i"-th pixel may be modified in various manners as necessary. In one example, the pair $A_i$ for the "i"-th pixel may correspond to $(co, \theta)$. In this example, a dominant direction $\theta$ denotes a direction of an eigenvector $e^1_i$ corresponding to a maximum eigenvalue $\lambda^1_i$. The dominant direction $\theta$ is calculated to be $\tan^{-1}(e^1_{i,y}/e^1_{i,x})$. $e^1_{i,y}$ denotes a y axis direction component of the eigenvector $e^1_i$, and $e^1_{i,x}$ denotes an x axis direction component of the eigenvector $e^1_i$. The strength "co" of coherence is calculated to be $(\lambda^1_i - \lambda^2_i)$. The strength "co" of coherence is also referred to as a dominant direction energy. In this example, the feature point detector calculates $D_i$ for the plurality of pixels based on Equation 5 in order to detect a feature point based on a contrast of coherence in a dominant direction.

$D_i$ is calculated by a sum of differences between a strength of coherence of an "i"-th pixel and strengths of coherence of neighboring pixels in $W_i$. The feature point detector determines the "i"-th pixel to be a feature point when $D_i$ is greater than a threshold value $\tau$. Alternatively, the feature point detector determines the "i"-th pixel to be a feature point when $D_i$ belongs to top N %, for example, top 2%. For example, the feature point detector detects a pixel 666 and a pixel 667 to be feature points from a matrix 665.

In another example, when an input image is a still image, a process to detect a feature point may be omitted because a number of pixels is negligible. In this example, local feature vectors for all pixels included in the input image are generated. Descriptions pertaining to the local feature vectors will be provided later.

Figure 7A:
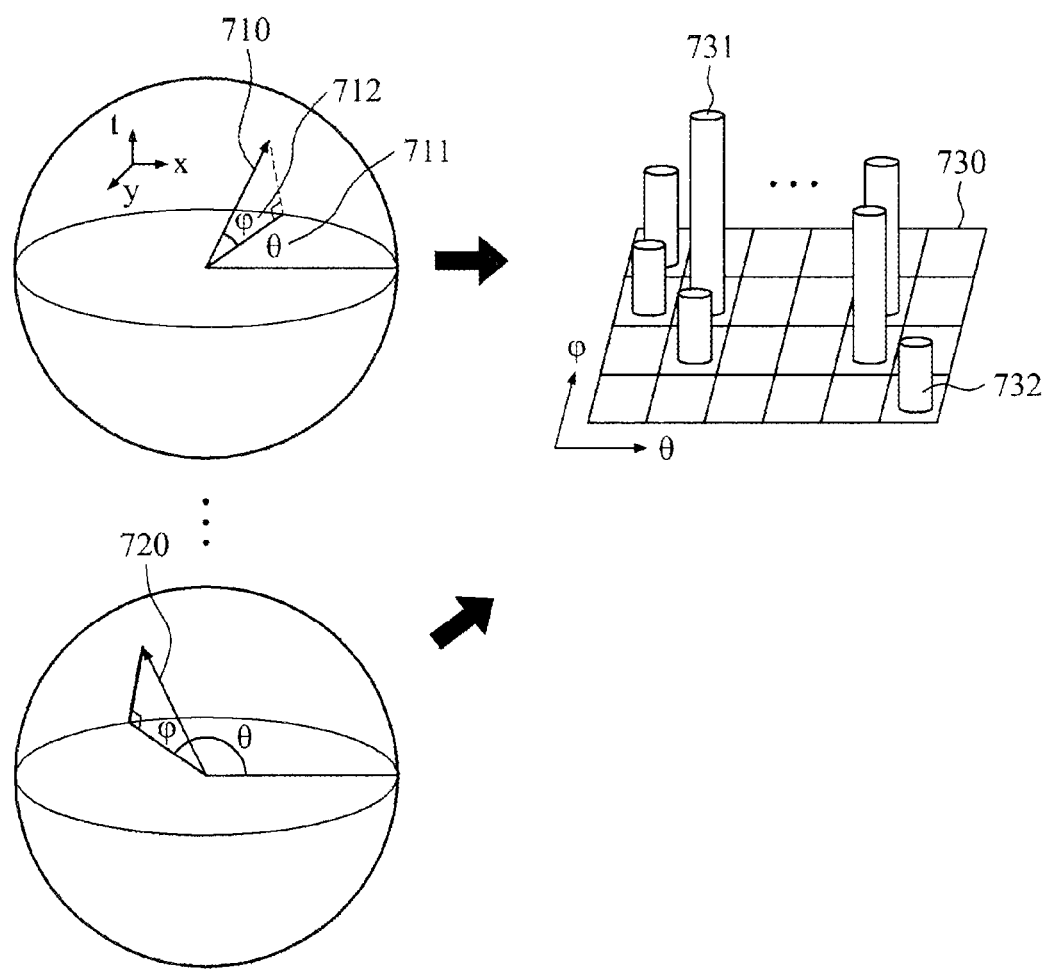
FIGS. 7A and 7B illustrate generation of a feature vector according to an example embodiment.

FIG. 7A illustrates generation of a feature vector according to an example embodiment. A local feature vector generator generates a feature vector corresponding to a feature point. As described above, the feature vector corresponding to the feature point is also referred to as a local feature vector or a local descriptor. The local feature vector generator quantizes a dominant direction of a detected feature point. For example, the local feature vector generator maps the dominant direction of the detected feature point to bins having a predetermined and/or desired size. Referring to FIG. 7A, the 3D space-time of (x, y, t) is represented by $(\theta, \phi)$. The local feature vector generator converts a dominant direction of a feature point detected based on Equation 7 to $(\theta, \phi)$.

$$\theta = \tan^{-1}(e^1_y/e^1_x), \text{ where } e^1 = [e^1_x, e^1_y, e^1_t]^T \quad \text{[Equation 7]}$$
$$\varphi = \tan^{-1}\left(\frac{e^1_t}{\sqrt{(e^1_x)^2 + (e^1_y)^2}}\right)$$

In Equation 7, $e^1$ denotes an eigenvector corresponding to a dominant direction of a detected feature point, and $e^1_x$, $e^1_y$, and $e^1_t$ each denote an x axis component, a y axis component, and a t axis component of the eigenvector. In one example, θ axis is allocated eight bins, and a φ axis is allocated five bins. Thus, the 3D space-time is quantized to 40 bins.

The local feature vector generator maps the dominant direction of the feature point to one of the bins, and accumulates a dominant direction energy of the feature point in the mapped bin. For example, when the dominant direction of the detected feature point is an eigenvector 710, the local feature vector generator maps the eigenvector 710 indicated by a pair of θ 711 and φ 712 to one of bins 730. The local feature vector generator sets a local region corresponding to a feature point, and performs the aforementioned dominant direction mapping and the accumulation of the dominant direction energy on a plurality of pixels included in the local region. As used herein, the local region refers to a matrix including a feature point and neighboring pixels in a vicinity of the feature point, and corresponds to the aforementioned "region for generating the local feature vector." In this example, the local feature vector generator maps, to the bins, a dominant direction of the feature point and a dominant direction for each of the plurality of pixels included in the local region in the vicinity of the feature point, and accumulates a dominant direction energy in the mapped bins. For example, aside from the dominant direction eigenvector 710 of a first feature point included in the local region, the dominant direction energy is accumulated by mapping a dominant direction eigenvector 720 with respect to the plurality of pixels included in the local region. A result of the accumulation is a feature vector corresponding to the feature point.

As a result, various magnitudes of dominant direction energies, for example, an accumulated energy 731 and an accumulated energy 732, are accumulated in each of the bins 730. A strength of coherence of the dominant direction is represented to be accumulated in each of the bins because the dominant direction energy is represented by the strength of coherence of the dominant direction. The local feature point generator calculates $f^{local}_i$ in a local region corresponding to a feature vector "i" detected based on Equation 8.

$$f^{local}_i = (f^{0,0}_i, f^{0,1}_i, \ldots, f^{0,L-1}_i, \ldots, f^{K-1,L-1}_i) \quad \text{[Equation 8]}$$
$$\text{where } f^{p,q}_i = \sum_{\theta_i \in p, \varphi_i \in q} \lambda_i$$

In Equation 8, θ is quantized to K number (e.g. 8) of bins, φ is quantized to L number (e.g., 5 of bins, and $\tilde{\theta}$ and $\tilde{\varphi}$ each denote an angle obtained by quantizing the dominant direction of the feature point "i". $f^{local}_i$ denotes a local feature vector corresponding to the feature point "i".

Figure 7B:
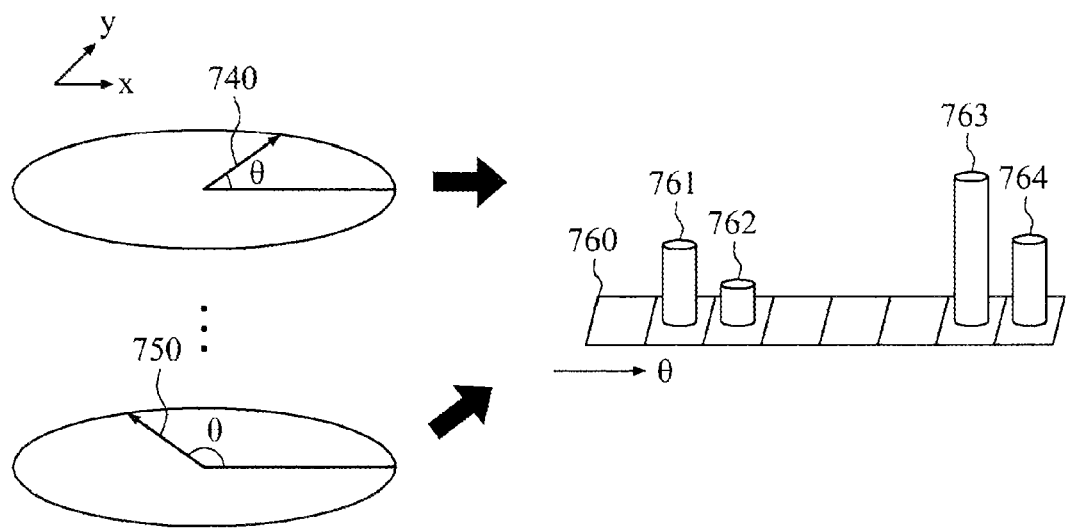

Referring to FIG. 7B, when an input image is a still image, a dominant direction is calculated to be a 2D vector. In this example, a 2D space-time of (x, y) is represented by θ, and θ is calculated to be $\tan^{-1}(e^1_{i,y}/e^1_{i,x})$. $e^1_{i,y}$ denotes a y axis direction vector component of an eigenvector $e^1_i$, and $e^1_{i,x}$ denotes an x axis direction vector component of the eigenvector $e^1_i$. The local feature vector generator quantizes a dominant direction θ 740 of the feature point. For example, the local feature vector generator maps the dominant direction θ 740 of the feature point to bins 760. In this example, the bins 760 quantize a one-dimensional (1D) space to a predetermined and/or desired size. In one example, the bins 760 quantize θ to eight bins. In this example, the 1D space is quantized to eight bins.

The local feature vector generator maps a dominant direction of a feature point to one of the bins, and accumulates a dominant direction energy of the feature point to the mapped bin. For example, the local feature vector generator sets a local region corresponding to the feature point, and performs the aforementioned dominant direction mapping and the accumulation of the dominant direction energy on a plurality of pixels included in the local region. In this example, the local feature vector generator maps a dominant direction of a feature point and a dominant direction for each of the pixels in the local region in a vicinity of the feature point to the bins, and accumulates a dominant direction energy to the mapped bins. By way of example, in addition to a dominant direction of a first feature point included in the local region, a dominant direction energy is accumulated by mapping a dominant direction with respect to each of the other remaining pixels included in the local region. A result of the accumulation is a feature vector corresponding to the feature point.

As a result, various magnitudes of dominant direction energies, for example, accumulated energies 761 through 764, are accumulated in each of the bins 760. A strength of coherence of the dominant direction is represented to be accumulated in each of the bins because the dominant direction energy is represented by the strength of coherence in the dominant direction.

In another example, when an input image is a still image, a process to detect a feature point may be omitted. In this example, the local feature vector generator quantizes the dominant direction θ for each of all the pixels included in the input image, and accumulates a dominant direction energy by mapping the quantized dominant direction to one of the bins. The local feature vector generator sets a local region corresponding to each of all the pixels included in the input image. The local feature vector generator performs the dominant direction mapping and the accumulation of the dominant direction energy in a unit of the local region, and generates a local feature vector corresponding to each local region.

Figure 8:
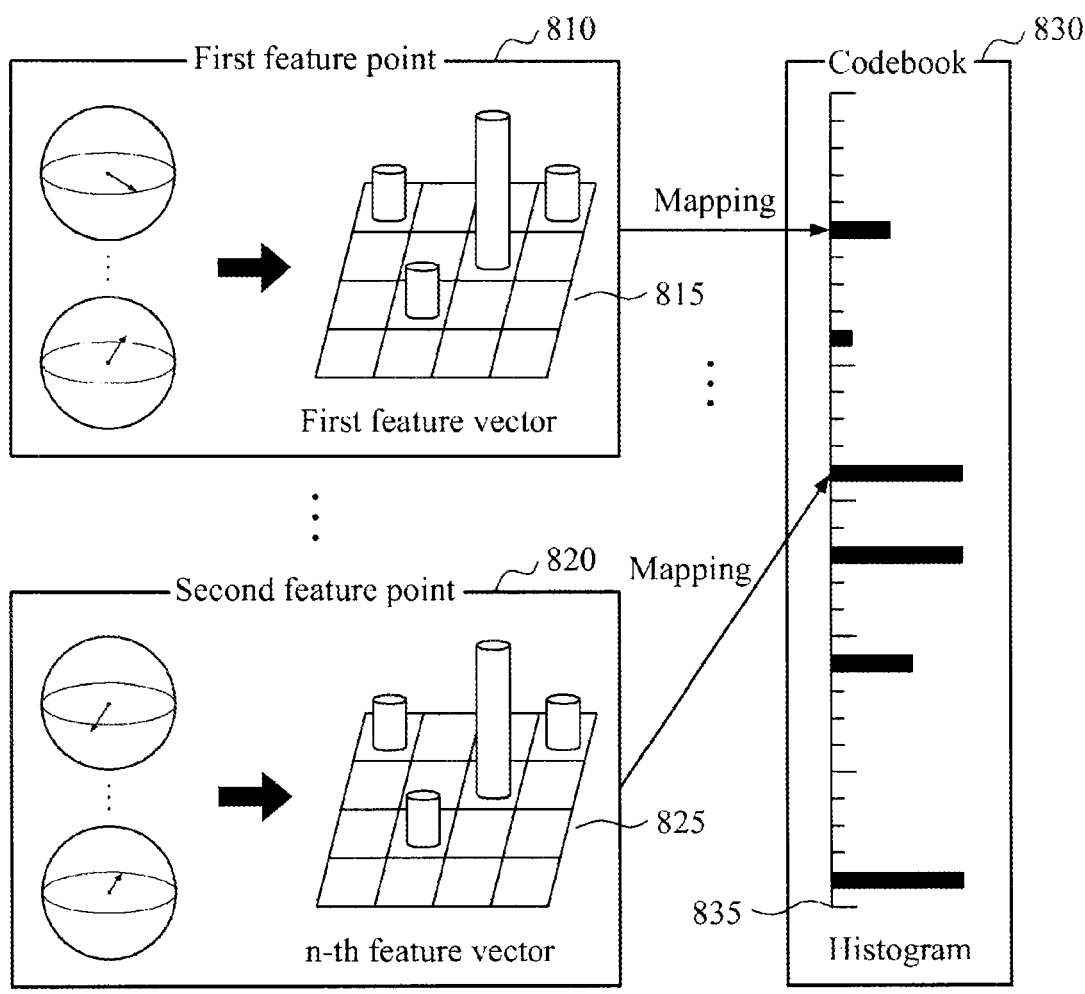
FIG. 8 illustrates generation of a histogram according to an example embodiment.

FIG. 8 illustrates generation of a histogram 835 according to an example embodiment. Referring to FIG. 8, a plurality of feature points 810 and 820 is detected from a single input image. A histogram generator maps feature vectors 815 and 825 corresponding to the plurality of feature points 810 and 820 to a codebook 830, and generates the histogram 835 corresponding to the input image. According to example embodiments, it is possible to analyze characteristics of an image in a single image unit including a plurality of frames rather than a single feature point unit or a single frame unit through use of a codebook-based histogram.

In one example, the histogram generator maps the first feature vector 815 corresponding to the first feature point 810 to one of a plurality of codewords included in the codebook 830. As used herein, the plurality of codewords included in the codebook 830 refers to vectors generated based on the aforementioned clustering method, and may represent a characteristic of a local feature vector representative of a training image.

The histogram generator maps the first feature vector 815 to a codeword most similar to the first feature vector 815 from among the plurality of codewords included in the codebook 830. For example, the histogram generator performs a codebook mapping based on various mapping methods, for example, a hard quantization method, a soft quantization method, or a sparse coding method. The histogram generator maps the "n"-th feature vector 825 corresponding to the "n"-th feature point 820 to one of the plurality of codewords included in the codebook 830. The histogram generator maps the "n"-th feature vector 825 to a codeword most similar to the "n"-th feature vector 825 from among the plurality of codewords included in the codebook 830. When differing feature vectors are mapped to an identical codeword, the histogram generator increases a count of the mapped codeword.

The histogram 835 reflects characteristics of an input image unit because the histogram 835 is generated through the plurality of feature vectors corresponding to the plurality of feature points detected from the single input image being mapped to the codebook 830. However, a number of frames differs for each image, and thereby a number of feature points detected differs for each image. The histogram generator normalizes the histogram 835 because an amplitude of a histogram of an image from which a relatively large number of feature points is detected, for example, an image having a great number of frames, may be greater than a histogram of an image from which a relatively small number of feature points is detected, for example, an image having a less number of frames. For example, the histogram generator normalizes the histogram 835 using an L-1 norm or L-2 norm.

According to other example embodiments, a process to detect a feature point may be omitted when an input image is a still image. In this example, the histogram generator maps feature vectors corresponding to all pixels included in the input image to a codebook, and generates a histogram corresponding to the input image.

Figure 9:
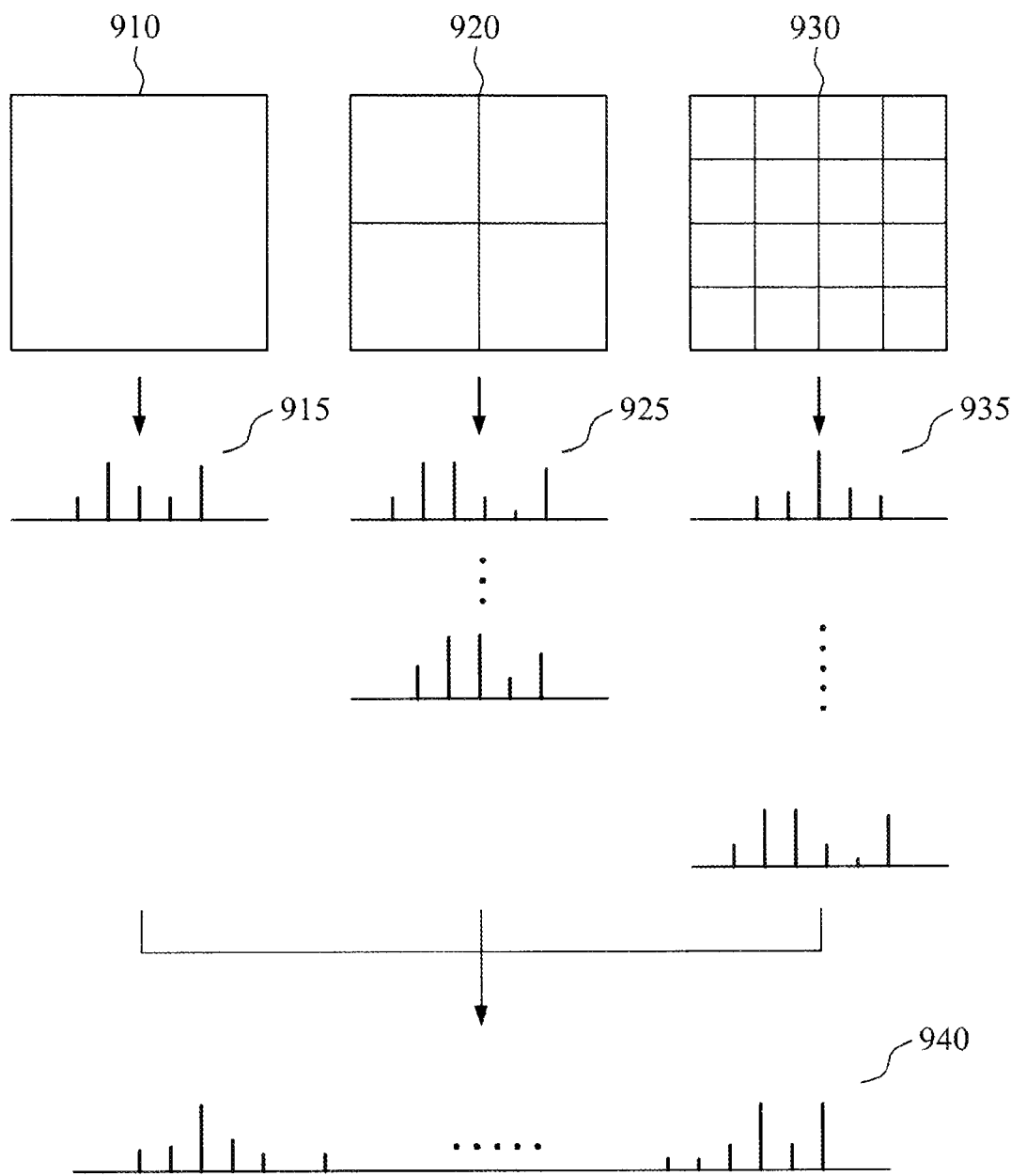
FIG. 9 illustrates generation of global feature vectors according to an example embodiment.

FIG. 9 illustrates generation of global feature vectors according to an example embodiment. Referring to FIG. 9, a global feature vector generator generates a global feature vector by performing a frequency analysis on an input image. In one example, the global vector generator arbitrarily selects one frame 910 of a plurality of frames included in the input image, or selects in a predetermined and/or desired manner. The global feature vector generator performs the frequency analysis on the selected frame 910. As a result of the frequency analysis, a plurality of pairs (amplitude, phase) is obtained. The global feature vector generator quantizes a plurality of phases to a predetermined and/or desired number of bins, for example, eight. The global feature vector generator maps a phase included in the plurality of pairs to one of the number of bins, and accumulates an amplitude of a corresponding pair in the mapped bin. As a result of the mapping and the accumulation, a global feature vector 915 is generated. When the plurality of phases is quantized to eight bins, the global feature vector 915 includes eight dimensions.

In another example, the global feature vector generator generates a global feature vector based on a spatial pyramid. The global feature vector generator arbitrarily selects one of a plurality of frames included in an input image, or performs the selection in a predetermined and/or desired manner. The global feature vector generator divides the plurality of frames into combinations of various global regions. In one example, the global feature vector generator divides the plurality of frames into four global regions 920. In another example, the global feature vector generator divides the plurality of frames into 16 global regions 930.

Similar to an instance of the single global region 910, the global feature vector generator performs the frequency analysis on each of the four global regions 920. As a result of the frequency analysis, a plurality of pairs (amplitude, phase) is obtained for each of the four global regions 920. The global feature vector generator quantizes the plurality of obtained phases to a predetermined and/or desired number of bins, for example, eight, for each of the four global regions 920. The global feature vector generator maps a phase included in the plurality of pairs to one of the predetermined and/or desired number of bins, and accumulates an amplitude of a corresponding pair in the mapped bin. As a result of the mapping and the accumulation, four global feature vectors 925 are generated. In an instance of the 16 global regions 930, 16 feature vectors 935 are generated. When the plurality of phases is quantized to eight bins, the global feature vectors 925 and the global feature vectors 935 each include eight dimensions.

The global feature vector generator combines a total of 21 global feature vectors, and generates a final global feature vector 940. The final global feature vector 940 includes 168 dimensions because each of the 21 global feature vectors includes eight dimensions when the plurality of phases is quantized to eight bins.

In another example, the global feature vector generator arbitrarily selects a portion of a plurality of frames included in an input image, or selects the in a predetermined and/or desired manner. For example, the global feature vector generator arbitrarily selects ten frames from among the plurality of frames. The global feature vector generator generates a global feature vector for each of the portion of the plurality of frames based on the method described with reference to FIG. 9. By way of example, the global feature vector generator generates global feature vectors using a spatial pyramid for each of the ten frames selected arbitrarily. The global feature vector generator generates the final global feature vector by calculating an average of the ten generated global feature vectors.

Figure 10:
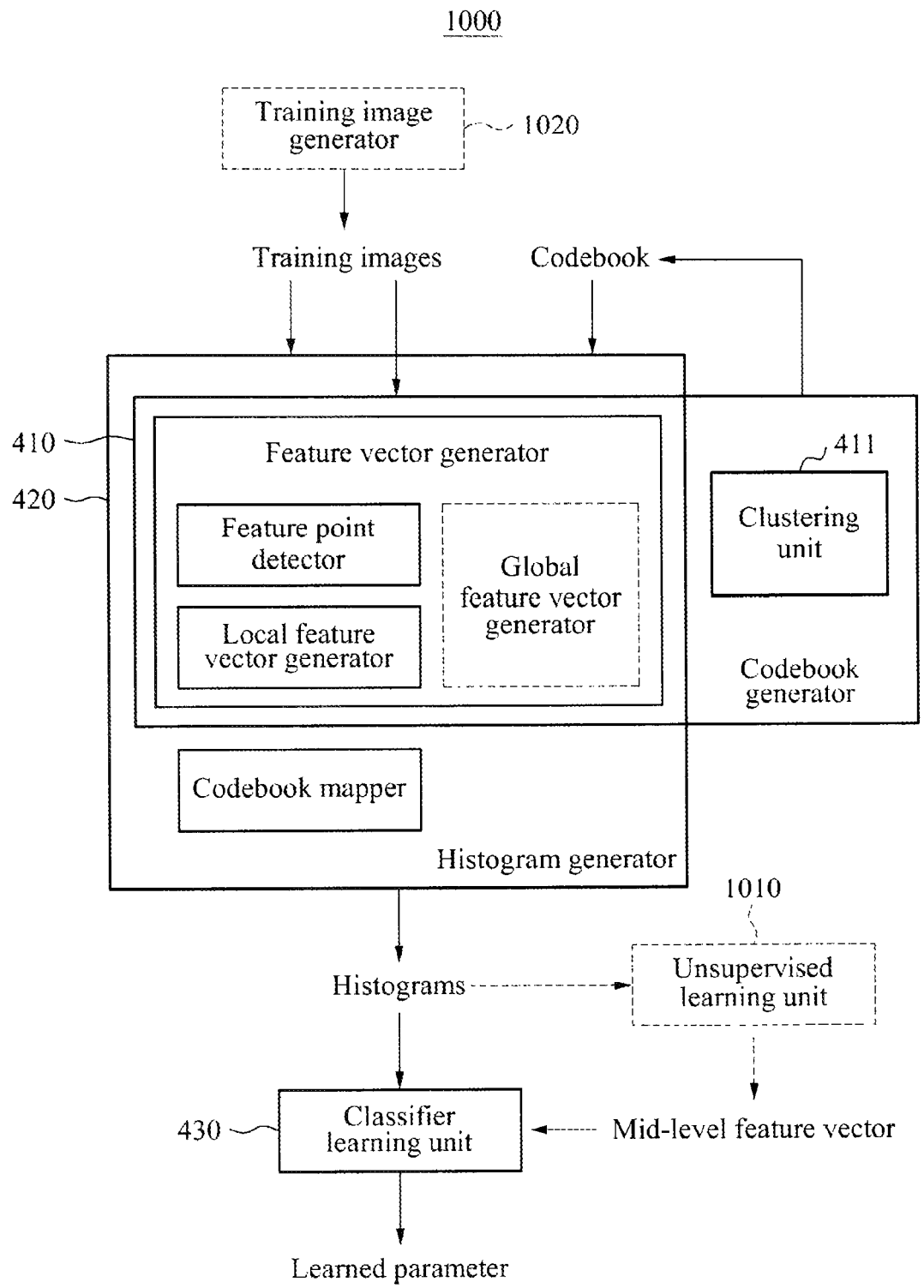
FIG. 10 illustrates an unsupervised learning unit and a training image generator according to an example embodiment.

FIG. 10 illustrates an unsupervised learning unit 1010 and a training image generator 1020 according to example embodiments. Referring to FIG. 10, the unsupervised learning unit 1010 generates a mid-level feature vector by performing an unsupervised learning on a histogram generated by the histogram generator 420. For example, the unsupervised learning unit 1010 learns a weight through a restricted Boltzmann machine (RBM) or a convolution sparse RBM, and extracts a mid-level feature vector through a convolution with respect to a plurality of codewords included in the generated histogram. In this example, the classifier learning unit 430 enables a learning of a classifier using the mid-level feature vector generated by the unsupervised learning unit 1010.

The unsupervised learning unit 1010 performs an unsupervised learning on an image patch arbitrarily extracted from an input image. The unsupervised learning unit 1010 combines characteristics extracted through the histogram and the unsupervised learning on the image patch, and generates the mid-level feature vector.

Figure 11:
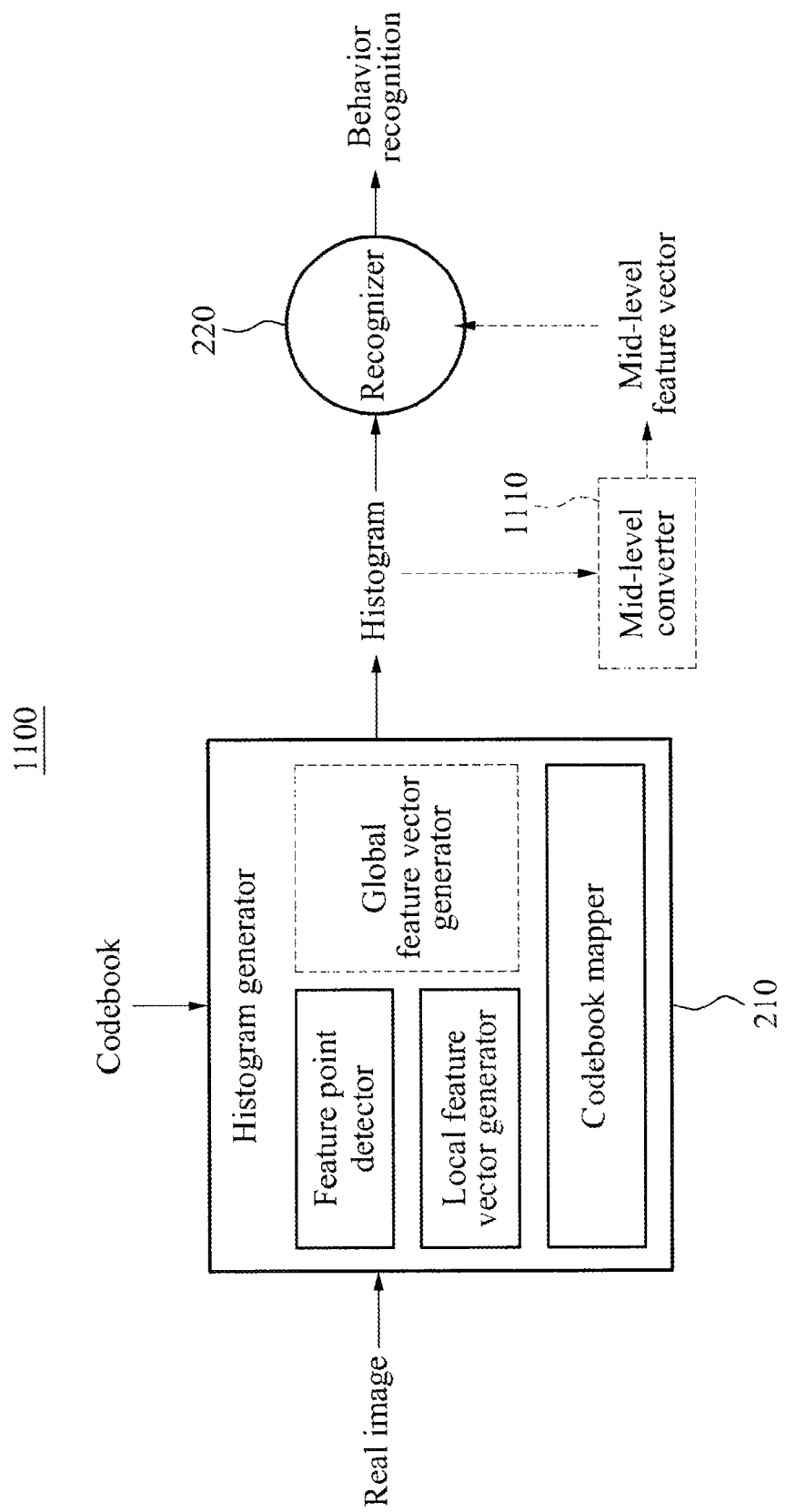
FIG. 11 illustrates a mid-level converter according to an example embodiment.

FIG. 11 illustrates a mid-level converter 1110 according to an example embodiment. Referring to FIG. 11, the mid-level converter 1110 converts the histogram generated by the histogram generator 210 to a mid-level feature vector. For example, the mid-level converter 1110 extracts the mid-level feature vector through a convolution with respect to a plurality of codewords included in a histogram through use of a weight learned by the unsupervised learning unit 1010 of FIG. 10. In this example, the recognizer 220 recognizes a behavior included in a real image through use of the mid-level feature vector extracted from the mid-level converter 1110. Since the technical features described with reference to FIGS. 1A through 9 may be directly applied to each module illustrated in FIG. 11, a detailed description will be omitted for conciseness.

The training image generator 1020 of FIG. 10 generates a training image using a performer model 1210. Referring to FIG. 12, the training image generator 1020 synthesizes the training image using the performer model 1210. For example, the training image generator 1020 generates synthetic training images with respect to a plurality of body types 1221 and 1222 based on the performer model 1210. Alternatively, the training image generator 1020 generates synthetic training images with respect to a plurality of backgrounds 1231 and 1232 based on the performer model 1210. Alternatively, the training image generator 1020 generates synthetic training images with respect to various image view points based on the performer model 1210. Alternatively, the training image generator 1020 generates synthetic training images with respect to various behavior speeds based on the performer model 1210. Alternatively, the training image generator 1020 generates various synthetic training images based on various combinations of the aforementioned synthesis. According to example embodiments, there is provided a method of efficiently learning an intra-class variation and an inter-class variation for each behavior based on the various training images generated by the training image generator 1020. Since the technical features described with reference to FIGS. 1A through 9 may be applied directly to each module illustrated in FIG. 10, a detailed description will be omitted for conciseness.

FIG. 13 illustrates a performance of detecting feature points according to an example embodiment. Referring to FIG. 13, when a lighting changes between a plurality of frames included in an input image, the performance of detecting the feature points is affected. For example, a brightness of a $75^{th}$ frame 1310 differs from a brightness of a $76^{th}$ frame 1320 subsequent to the $75^{th}$ frame 1310. In this example, a brightness changes in a background aside from a change in a performer, and a large number of feature points is detected from the background due to the brightness change in the background. The feature points detected from the background function as noise in recognizing a behavior of a performer included in an image, and deteriorate a performance in recognizing the behavior.

Referring to a frame 1330 and a frame 1340, when a feature point is detected using a corner point, a large number of feature points is detected from a region corresponding to a background due to a brightness change in the background. For example, a performance of detecting a feature point is degraded through a detection of a large number of feature points corresponding to a background due to a brightness difference between the frame 1330 and the frame 1340.

Conversely, according to an example embodiment, there is provided a method of recognizing a behavior robust to a change in a lighting by detecting a feature point based on a contrast of coherence in a dominant direction in an image. For example, referring to a frame 1350 and a frame 1360, a performance of detecting a feature point is enhanced when feature points are detected based on a dominant direction. Despite a brightness difference between the frame 1350 and the frame 1360, feature points corresponding to a performer are largely detected while feature points corresponding to a background are scarcely detected from the frame 1360.

FIG. 14 illustrates a performance of feature vectors according to an example embodiment. Referring to FIG. 14, when noise is included in an input image, the performance of the feature vectors is affected. The performance of the feature vectors enhances as a similarity of a feature vector with respect to an original image 1410 absent noise to a feature vector with respect to a noise image 1420 including noise increases because a behavior included in an image does not change due to noise. However, in a conventional feature vector 1430 using a corner point as a feature point, a feature vector with respect to the original image 1440 and a feature vector with respect to the noise image 1420 including noise differ from each other. In the conventional feature vector 1430, the feature vector is affected by noise.

In a feature vector 1440 generated based on a dominant direction according to example embodiments, the feature vector with respect to the original image 1410 and the feature vector with respect to the noise image 1420 including noise are relatively identical to each other. The feature vector 1440 according to example embodiments is durable against noise. According to example embodiments, there is provided a method of recognizing a behavior robust to noise by defining a descriptor using a dominant direction in a local region in an image and a strength of coherence.

According to an example embodiment, there is provided a method of recognizing a behavior applicable to a real life in which general contents such as films or sports images, a camera movement, a lighting change, or a complex background are present, in a manner dissimilar to conventional methods of recognizing a behavior based on a restricted environment. In one example, the method of recognizing the behavior according to example embodiments may be applied to a method of searching for behavior-based content from various user terminals, for example, a smart phone. By way of example, the method of recognizing the behavior according to example embodiments may be applied to a method of recognizing a kissing behavior of a user and searching for content corresponding to the recognized kissing behavior. In another example, the method of recognizing the behavior according to example embodiments may be applied to a monitoring system for detecting an abnormal behavior in public places or an application for medical check-up.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. A method of generating a feature vector, the method comprising:
    detecting a feature point from an input image based on a dominant direction of a gradient distribution in the input image, the detecting including,
        detecting a pixel corresponding to a window having a contrast of coherence in a dominant direction; and
    generating a feature vector corresponding to the feature point.

2. The method of claim 1, wherein the
    contrast of coherence is an indication of differences between at least one eigenvalue associated with the detected pixel and eigenvalues of other pixels in the window.

3. The method of claim 1, wherein the generating of the feature vector comprises:
    accumulating a strength of coherence in a dominant direction within a local area corresponding to the feature point to generate the feature vector.

4. The method of claim 1, wherein the detecting of the feature point comprises:
    calculating a gradient for a plurality of pixels comprised in the input image;
    calculating a structure tensor for the plurality of pixels based on the gradient;
    calculating a maximum eigenvalue for the plurality of pixels by performing an Eigen analysis on the structure tensor; and
    determining the feature point through a contrast amongst maximum eigenvalues.

5. The method of claim 4, wherein the calculating of the structure tensor for the plurality of pixels comprises:
    when the input image is a video image, calculating a structure tensor of a single pixel based on a matrix $$\begin{bmatrix} \sum_B G_x^2 & \sum_B G_x G_y & \sum_B G_x G_t \\ \sum_B G_x G_y & \sum_B G_y^2 & \sum_B G_y G_t \\ \sum_B G_x G_t & \sum_B G_y G_t & \sum_B G_t^2 \end{bmatrix},$$

wherein $G_x$ denotes a gradient in an x axis direction, $G_y$ denotes a gradient in a y axis direction, $G_t$ denotes a gradient in a time axis direction, and B denotes a predetermined size of a block comprising the single pixel.

6. The method of claim 4, wherein the calculating of the structure tensor for the plurality of pixels comprises:
    when the input image is a still image, calculating a structure tensor of a single pixel based on a matrix $$\begin{bmatrix} \sum_B G_x^2 & \sum_B G_x G_y \\ \sum_B G_x G_y & \sum_B G_y^2 \end{bmatrix},$$

wherein $G_x$ denotes a gradient in an x axis direction, $G_y$ denotes gradient in a y axis direction, and B denotes a predetermined size of a block comprising the single pixel.

7. The method of claim 4, wherein the determining of the feature point comprises:
    calculating a sum of differences between a strength of coherence of a single pixel and strengths of coherence of neighboring pixels within a window corresponding to the single pixel; and
    determining the single pixel to be the feature point when the sum is greater than a threshold value.

8. The method of claim 7, wherein the strength of coherence comprises at least one of:
    a maximum eigenvalue of the single pixel; and
    a difference between the maximum eigenvalue and another eigenvalue of the single pixel.

9. The method of claim 1, wherein the generating of the feature vector comprises:
    with respect to a local pixels comprised in a local region, mapping the dominant direction of a local pixel to predetermined bins; and
    accumulating a dominant direction energy of the local pixel in the mapped bin.

10. The method of claim 9, wherein the dominant direction energy is a strength of coherence associated with a gradient of the local pixel, and the dominant direction corresponds to a maximum eigenvalue associated with the gradient of the local pixel.

11. The method of claim 9, wherein the predetermined bins quantize a time and a space of the input image to a predetermined number when the input image is a video image.

12. The method of claim 9, wherein the predetermined bins quantize the space of the input image to a predetermined number when the input image is a still image.

13. The method of claim 1, wherein the gradient comprises:
    when the input image is a video image, a gradient in an x axis direction in a frame comprised in the input image, a gradient in a y axis direction in the frame comprised in the input image, and a gradient in a time axis direction between frames comprised in the input image.

14. The method of claim 1, wherein the gradient comprises:
    when the input image is a still image, a gradient in an x axis direction in a frame comprised in the input image and a gradient in a y axis direction in the frame comprised in the input image.

15. The method of claim 1, further comprising:
    generating of the feature vector corresponding to the input image based on a frequency characteristic extracted from the input image.

16. The method of claim 1, further comprising:
    dividing the input image into combinations of a plurality of global regions using a spatial pyramid; and
    extracting frequency characteristics of the plurality of global regions comprised in the combinations of the plurality of global regions, and generating feature vectors corresponding to the plurality of global regions.

17. A non-transitory computer-readable medium comprising a program for instructing a computer to perform the method of claim 1.

18. A method of image processing, the method comprising:
    detecting a plurality of feature points comprised in an input image based on a dominant direction of a gradient distribution in the input image;
    generating a plurality of feature vectors corresponding to the plurality of feature points, the generating including accumulating a strength of coherence in the dominant direction within a local region corresponding to the plurality of feature points in order to generate the plurality of feature vectors; and
    mapping the plurality of feature vectors to codewords in a codebook, to generate a histogram corresponding to the input image based on the mapped feature vectors.

19. The method of claim 18, further comprising:
    analyzing the input image based on a learned parameter and the histogram.

20. The method of claim 19, wherein the learned parameter is generated by pre-learning a plurality of training images based on the dominant direction analysis of the gradient distribution.

21. The method of claim 19, wherein the analyzing of the input image comprises:
    recognizing content of the input image.

22. The method of claim 21, wherein the content of the input image comprises at least one of:
    a behavior of a performer comprised in the input image; and
    an object comprised in the input image.

23. The method of claim 18, wherein the generating of the histogram comprises:
    normalizing values corresponding to the codewords, and generating a normalized histogram.

24. The method of claim 18, further comprising:
    detecting a set of feature points from a plurality of training images based on the dominant direction analysis;
    generating feature vectors corresponding to a portion of feature points selected arbitrarily from among the set of feature points;
    clustering the feature vectors corresponding to the portion of feature points; and
    generating the codebook.

25. The method of claim 18, wherein the detecting of the plurality of feature points comprises:
    detecting pixels corresponding to windows having a contrast of coherence in a dominant direction to be the plurality of feature points.

26. The method of claim 18, wherein the
    strength of coherence is based on a difference between eigenvalues associated with the feature point.

27. The method of claim 18, further comprising:
    generating a global feature vector corresponding to the input image based on a frequency characteristic extracted from the input image; and
    combining the histogram and the global feature vector.

28. The method of claim 18, further comprising:
    unsupervised learning of the histogram; and
    generating a mid-level feature vector.

29. An apparatus for learning a classifier, the apparatus comprising:
    a detector configured to detect a plurality of feature points comprised in a plurality of training images based on a dominant direction analysis of a gradient distribution, wherein the detector is configured to detect pixels corresponding to windows having a contrast of coherence in a dominant direction to be the plurality of feature points;
    a generator configured to generate a plurality of feature vectors corresponding to the plurality of feature points;
    a mapper configured to map the plurality of feature vectors to codewords comprised in a given codebook, and generate a histogram corresponding to the plurality of training images; and
    a learning unit configured to learn a classifier based on the histogram.

30. The apparatus of claim 29, wherein the learning unit is configured to receive the histogram and a label of the plurality of training images to learn the classifier.

31. The apparatus of claim 29, further comprising:
    a clustering unit configured to cluster the plurality of feature vectors, and generate the codebook.

32. The apparatus of claim 29, wherein the contrast of coherence is an indication of a difference between at least one eigenvalue associated with the detected pixel and eigenvalues of other pixels in the window.

33. The apparatus of claim 29, wherein the generator is configured to accumulate a strength of coherence.

34. The apparatus of claim 29, wherein the mapper is configured to map a set of the plurality of feature vectors generated from a corresponding training image from among the plurality of training images, and generates a histogram corresponding to the corresponding training image.

35. The apparatus of claim 29, wherein the mapper is configured to
    normalize values corresponding to the codewords, and generate a normalized histogram.

36. A recognition apparatus, the apparatus comprising:
    a detector configured to detect a plurality of feature points in an input image based on a dominant direction analysis of a gradient distribution;
    a generator configured to generate a plurality of feature vectors corresponding to the plurality of feature points, wherein the generator is configured to accumulate a strength of coherence in a dominant direction of a local region corresponding to the plurality of feature points in order to generate the plurality of feature vectors;
    a mapper configured to map the plurality of feature vectors in a given codebook, and generate a histogram corresponding to the input image; and
    a recognizer configured to recognize content of the input image based on a learned parameter and the histogram.

37. The apparatus of claim 36, wherein the content of the input image comprises
    at least one of a behavior of a performer comprised in the input image; and
    an object comprised in the input image.

38. The apparatus of claim 36, wherein the learned parameter is generated by pre-learning a plurality of training images based on the dominant direction analysis of the gradient distribution.

39. The apparatus of claim 36, wherein the detector is configured to detect pixels corresponding to windows having a contrast of coherence in a dominant direction to be the plurality of feature points.

40. The apparatus of claim 36, wherein the strength of coherence is based on a difference between eigenvalues associated with the feature point.

41. A detection apparatus, the apparatus comprising:
- a feature point detector configured to detect a plurality of feature points comprised in at least a portion of an input image based on a dominant direction analysis of a gradient distribution, wherein the feature point detector is configured to detect pixels corresponding to window having a contrast of coherence in a dominant direction to be the plurality of feature points;
- a generator configured to generate a plurality of feature vectors corresponding to the plurality of feature points;
- a mapper configured to map the plurality of feature vectors to codewords comprised in a given codebook, and generate a histogram corresponding to the at least one portion; and
- a region detector configured to compare a reference histogram to the histogram, and detect a region corresponding to the reference histogram.

42. The apparatus of claim 41, wherein the feature point detector is configured to detect a plurality of reference feature points comprised in a reference image based on the dominant direction analysis of the gradient distribution,
- the generator is configured to generate a plurality of reference feature vectors corresponding to the plurality of reference feature points, and
- the mapper is configured to map the plurality of reference feature vectors to the codewords, and generates the reference histogram corresponding to the reference image.

* * * * *